(12) United States Patent
Nazar et al.

(10) Patent No.: US 10,123,343 B2
(45) Date of Patent: Nov. 6, 2018

(54) CHANNEL STATE INFORMATION TRANSMISSION FOR MULTIPLE CARRIERS

(71) Applicant: INTERDIGITAL PATENT HOLDINGS, INC., Wilmington, DE (US)

(72) Inventors: Shahrokh Nayeb Nazar, San Diego, CA (US); Robert L. Olesen, Huntington, NY (US); Paul Marinier, Brossard (CA); Ghyslain Pelletier, Montreal (CA); Kyle Jung-Lin Pan, Saint James, NY (US); Marian Rudolf, Montreal (CA); Muhammad U. Fazili, Audubon, PA (US); Lakshmi R. Iyer, King of Prussia, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 81 days.

(21) Appl. No.: 15/179,195

(22) Filed: Jun. 10, 2016

(65) Prior Publication Data

US 2017/0156152 A1    Jun. 1, 2017

Related U.S. Application Data

(63) Continuation of application No. 12/987,647, filed on Jan. 10, 2011, now Pat. No. 9,391,736.

(Continued)

(51) Int. Cl.
*H04W 72/10* (2009.01)
*H04W 24/08* (2009.01)
(Continued)

(52) U.S. Cl.
CPC .......... *H04W 72/10* (2013.01); *H04W 24/08* (2013.01); *H04W 24/10* (2013.01);
(Continued)

(58) Field of Classification Search
CPC ... H04L 1/0693; H04L 1/0675; H04L 1/0023; H04L 1/0027; H04L 1/0028
(Continued)

(56) References Cited

U.S. PATENT DOCUMENTS 4,520,490 A   5/1985   Wei
5,305,349 A   4/1994   Dent
(Continued)

FOREIGN PATENT DOCUMENTS

CN   1552132 A   12/2004
CN   1983943 A    6/2007
(Continued)

OTHER PUBLICATIONS

3rd Generation Partnership Project (3GPP), R1-073616, "Signaling Parameters for UL ACK/NACK Resources", Panasonic, 3GPP TSG-RAN WG1, Meeting #50, Athens, Greece, Aug. 20-24, 2007, 3 pages.
(Continued)

*Primary Examiner* — Benjamin H Elliott, IV
(74) *Attorney, Agent, or Firm* — Condo Roccia Koptiw LLP

(57) ABSTRACT

Channel state information is reported in periodic and aperiodic reports for multiple component carriers or serving cells. Channel state information may be reported for a subset of aggregated downlink carriers or serving cells. For an aperiodic report, the carrier(s)/serving cell(s) for which channel state information is reported may be determined based on the request for the aperiodic report. A report collision may occur in a subframe between a periodic CSI report for a first serving cell and a report for a second serving cell. A priority rule may be used to resolve the report collision.

12 Claims, 18 Drawing Sheets

Related U.S. Application Data

(60) Provisional application No. 61/293,412, filed on Jan. 8, 2010, provisional application No. 61/329,743, filed on Apr. 30, 2010, provisional application No. 61/356,400, filed on Jun. 18, 2010, provisional application No. 61/356,449, filed on Jun. 18, 2010, provisional application No. 61/389,057, filed on Oct. 1, 2010.

(51) Int. Cl.
*H04W 72/04* (2009.01)
*H04W 24/10* (2009.01)
*H04W 74/08* (2009.01)

(52) U.S. Cl.
CPC ... *H04W 72/0413* (2013.01); *H04W 72/0446* (2013.01); *H04W 74/0841* (2013.01)

(58) Field of Classification Search
USPC ....... 370/236, 247, 250, 251, 329, 332, 334, 370/341, 450
See application file for complete search history.

(56) References Cited

U.S. PATENT DOCUMENTS

| | | | |
|---|---|---|---|
| 5,903,595 A | 5/1999 | Suzuki | |
| 7,050,419 B2 | 5/2006 | Azenkot et al. | |
| 7,352,796 B1 | 4/2008 | von der Embse | |
| 7,352,817 B2 | 4/2008 | Milbar | |
| 7,929,415 B2 | 4/2011 | Kwak et al. | |
| 8,121,292 B2 | 2/2012 | Jou et al. | |
| 8,331,347 B2 | 12/2012 | Kishiyama et al. | |
| 8,867,548 B2 | 10/2014 | Ahn et al. | |
| 9,057,772 B1 | 6/2015 | Chavez et al. | |
| 9,094,169 B2 | 7/2015 | Shen et al. | |
| 9,391,736 B2* | 7/2016 | Nayeb Nazar | H04L 1/0027 |
| 9,485,060 B2 | 11/2016 | Nayeb et al. | |
| 2001/0016862 A1 | 8/2001 | Saito et al. | |
| 2002/0191703 A1 | 12/2002 | Ling et al. | |
| 2003/0103554 A1 | 6/2003 | Li et al. | |
| 2003/0161471 A1 | 8/2003 | Jou et al. | |
| 2004/0063399 A1 | 4/2004 | Milbar | |
| 2004/0076188 A1 | 4/2004 | Milbar et al. | |
| 2004/0131025 A1 | 7/2004 | Dohler et al. | |
| 2004/0223553 A1 | 11/2004 | Kumar | |
| 2005/0220200 A1 | 10/2005 | Giannakis et al. | |
| 2006/0013161 A1 | 1/2006 | Suzuki | |
| 2007/0036065 A1 | 2/2007 | Wang | |
| 2007/0171849 A1 | 7/2007 | Zhang et al. | |
| 2007/0244950 A1 | 10/2007 | Golic | |
| 2007/0258384 A1 | 11/2007 | Sammour et al. | |
| 2007/0263586 A1 | 11/2007 | You et al. | |
| 2008/0075032 A1 | 3/2008 | Balachandran et al. | |
| 2008/0165697 A1 | 7/2008 | Zeira et al. | |
| 2008/0215798 A1 | 9/2008 | Sharon et al. | |
| 2008/0225783 A1 | 9/2008 | Wang et al. | |
| 2008/0273610 A1 | 11/2008 | Malladi et al. | |
| 2008/0279211 A1 | 11/2008 | Chitrapu et al. | |
| 2008/0285675 A1 | 11/2008 | Roberts | |
| 2008/0298488 A1 | 12/2008 | Shen et al. | |
| 2009/0028219 A1 | 1/2009 | Djuknic | |
| 2009/0041240 A1 | 2/2009 | Parkvall et al. | |
| 2009/0052430 A1 | 2/2009 | Gorokhov et al. | |
| 2009/0088154 A1 | 4/2009 | Umatt et al. | |
| 2009/0129259 A1 | 5/2009 | Malladi et al. | |
| 2009/0135803 A1 | 5/2009 | Luo et al. | |
| 2009/0175159 A1 | 7/2009 | Bertrand et al. | |
| 2009/0190528 A1 | 7/2009 | Chung et al. | |
| 2009/0196247 A1 | 8/2009 | Fan et al. | |
| 2009/0207797 A1 | 8/2009 | Shen et al. | |
| 2009/0238131 A1 | 9/2009 | Montojo et al. | |
| 2009/0238366 A1 | 9/2009 | Park et al. | |
| 2009/0252200 A1 | 10/2009 | Dohler et al. | |
| 2009/0254333 A1 | 10/2009 | Alt | |
| 2009/0303972 A1 | 12/2009 | Flammer, III et al. | |
| 2010/0039970 A1 | 2/2010 | Papasakellariou et al. | |
| 2010/0098050 A1 | 4/2010 | Yamada et al. | |
| 2010/0103833 A1 | 4/2010 | Englund et al. | |
| 2010/0118817 A1 | 5/2010 | Damnjanovic et al. | |
| 2010/0195575 A1* | 8/2010 | Papasakellariou | H04W 36/385 370/328 |
| 2010/0220814 A1 | 9/2010 | Wu et al. | |
| 2010/0272019 A1 | 10/2010 | Papasakellariou et al. | |
| 2010/0278109 A1 | 11/2010 | Papasakellariou et al. | |
| 2010/0311431 A1 | 12/2010 | Papasakellariou et al. | |
| 2011/0103498 A1 | 5/2011 | Chen et al. | |
| 2011/0110304 A1 | 5/2011 | Kuchi et al. | |
| 2011/0142000 A1 | 6/2011 | Han et al. | |
| 2011/0164575 A1 | 7/2011 | Brunel et al. | |
| 2011/0170488 A1 | 7/2011 | Chitrapu et al. | |
| 2011/0170489 A1 | 7/2011 | Han et al. | |
| 2011/0176443 A1 | 7/2011 | Astely et al. | |
| 2011/0188467 A1 | 8/2011 | Kawamura et al. | |
| 2011/0242982 A1* | 10/2011 | Lunttila | H04L 5/001 370/241 |
| 2011/0249578 A1 | 10/2011 | Nayeb et al. | |
| 2011/0261759 A1 | 10/2011 | Yamada et al. | |
| 2012/0026939 A1 | 2/2012 | Sindhushayana et al. | |
| 2012/0076028 A1* | 3/2012 | Ko | H04L 1/0026 370/252 |
| 2012/0147831 A1 | 6/2012 | Golitschek | |
| 2017/0006602 A1 | 1/2017 | Kwon et al. | |
| 2017/0156152 A1* | 6/2017 | Nazar | H04W 72/10 |

FOREIGN PATENT DOCUMENTS

| | | |
|---|---|---|
| CN | 101395855 A | 3/2009 |
| CN | 101505293 A | 8/2009 |
| EP | 1178623 A2 | 2/2002 |
| JP | 2010-522461 A | 7/2010 |
| JP | 2013-501441 A | 1/2013 |
| JP | 2013-514687 A | 4/2013 |
| JP | 2013-524602 A | 6/2013 |
| KR | 10-2012-0039694 A | 4/2012 |
| RU | 2330379 C2 | 7/2008 |
| WO | WO 2008/153350 A1 | 12/2008 |
| WO | WO 2009/023730 A2 | 2/2009 |
| WO | WO2009/132203 A1 | 10/2009 |
| WO | WO 2009/156929 A2 | 12/2009 |
| WO | WO 2010/000312 A1 | 1/2010 |
| WO | WO 2010/121708 A1 | 10/2010 |
| WO | WO 2010/144875 A2 | 12/2010 |
| WO | WO 2011/015331 A1 | 2/2011 |
| WO | WO 2011/019795 A1 | 2/2011 |
| WO | WO 2011/041623 A1 | 4/2011 |
| WO | WO 2011/072813 A1 | 6/2011 |
| WO | WO 2011/120432 A1 | 10/2011 |
| WO | WO 2011/121063 A1 | 10/2011 |

OTHER PUBLICATIONS

3rd Generation Partnership Project (3GPP), R1-080193, "Simultaneous ACK/NAK and SR Transmission in Uplink", Texas Instruments, 3GPP TSG-RAN WG1, Meeting #51bis, Sevilla, Spain, Jan. 14-18, 2008, 6 pages.

3rd Generation Partnership Project (3GPP), R1-092558, "CSI Payload Extension Using PUCCH and Periodic PUCCH", Nokia Siemens Networks, Nokia, 3GPP TSG RAN WG1, Meeting #57bis, Los Angeles, CA, Jun. 29-Jul. 3, 2009, 2 pages.

3rd Generation Partnership Project (3GPP), R1-092575, "Summary of Email Discussion on Carrier Aggregation Terminology", Nokia, 3GPP TSG RAN WG1, Meeting #57bis, Los Angeles, CA, Jun. 29-Jul. 3, 2009, 2 pages.

3rd Generation Partnership Project (3GPP), R1-093046, "PUCCH Design for Carrier Aggregation", Huawei, 3GPP TSR-RAN WG1, Meeting #58, Shenzhen, China, Aug. 24 28, 2009, 8 pages.

3rd Generation Partnership Project (3GPP), R1-093699, "Way Forward on PDCCH for Bandwidth Extension in LTE-A", Alcatel-Lucent, 3GPP TSG-RAN WG1 Meeting #58, Shenzhen, China, Aug. 24-28, 2009, 2 pages.

(56) References Cited

OTHER PUBLICATIONS

3rd Generation Partnership Project (3GPP), R1-094207, "CQI Feedback for Multicarrier Operation", Qualcomm Europe, 3GPP TSG RAN WG1, Meeting #58bis, Miyazaki, Japan, Oct. 12-16, 2009, 4 pages.
3rd Generation Partnership Project (3GPP), R1-094388, "Way Forward on PUCCH for Carrier Aggregation", Ericsson, 3GPP TSG RAN WG1, Meeting #58bis, Miyazaki, Japan, Oct. 12-16, 2009, 2 pages.
3rd Generation Partnership Project (3GPP), R1-094502, "CQI Reporting for Carrier Aggregation", Panasonic, HTC Corporation, 3GPP TSG-RAN WG1, Meeting #59, Jeju, Korea, Nov. 9-13, 2009, 2 pages.
3rd Generation Partnership Project (3GPP), R1-094544, "CQI Feedback for LTE-A", CATT, 3GPP TSG RAN WG1, Meeting #59, Jeju, Korea, Nov. 9-13, 2009, 5 pages.
3rd Generation Partnership Project (3GPP), R1-100044, "A/N Transmission in the Uplink for Carrier Aggregation", Ericsson, ST-Ericsson, 3GPP TSG-RAN WG1, Meeting #59bis, Valencia, Spain, Jan. 18-22, 2010, 3 pages.
3rd Generation Partnership Project (3GPP), R1-100099, "DAI Transmission for LTE-A TDD", Samsung, 3GPP TSG RAN WG1, Meeting #59bis, Valencia, Spain, Jan. 18-22, 2010, 4 pages.
3rd Generation Partnership Project (3GPP), R1-100675, "UL HARQ Feedback for Multicarrier Operation", Qualcomm, 3GPP TSG-RAN WG1, Meeting #59bis, Valencia, Spain, Jan. 18-22, 2010, 5 pages.
3rd Generation Partnership Project (3GPP), R1-100838, "Chairman's Notes", Chairman, 3GPP TSG-RAN WG1, Meeting #60, San Francisco, CA, February 22-26, 2010, 6 pages.
3rd Generation Partnership Project (3GPP), R1-100909, "A/N Transmission in the Uplink for Carrier Aggregation", Ericsson, 3GPP TSG-RAN WG1, Meeting #60, San Francisco, CA, Feb. 22-26, 2010, 4 pages.
3rd Generation Partnership Project (3GPP), R1-101258, "Periodic CQI Reporting for Carrier Aggregation", Panasonic, 3GPP TSG-RAN WG1 Meeting 60, San Francisco, U.S.A., Feb. 22-26, 2010, 4 pages.
3rd Generation Partnership Project (3GPP), R1-101418, "Performance Comparison of PUCCH ACK/NACK Transmission Schemes for CC Aggregation", Nokia Siemens Networks, Nokia, 3GPP TSG-RAN WG1, Meeting #60, San Francisco, CA, Feb. 22-26, 2010, 5 pages.
3rd Generation Partnership Project (3GPP), R1-101477, "UL ACK for MC Operation", Qualcomm Incorporated, 3GPP TSG-RAN WG1, Meeting #60, San Francisco, CA, Feb. 22-26, 2010, 5 pages.
3rd Generation Partnership Project (3GPP), R1-101731, "Evaluation of PUCCH Proposals for Carrier Aggregation", Ericsson, ST-Ericsson, 3GPP TSG-RAN WG1 #60bis, Beijing, China, Apr. 12-16, 2010, 9 pages.
3rd Generation Partnership Project (3GPP), R1-101940, "CQI/PMI/RI Reporting for Carrier Aggregation", Huawei, 3GPP TSG RAN WG1 Meeting #60bis, Beijing, China, Apr. 12-16, 2010, 5 pages.
3rd Generation Partnership Project (3GPP), R1-102745, "CQI for CA", Qualcomm, 3GPP TSG RAN WG1 #61, Montreal, Canada, May 10-14, 2010, 3 pages.
3rd Generation Partnership Project (3GPP), R1-103004, "Concurrent Transmission of Scheduling Request Indicator and ACK/NACK Information for LTE-Advanced", Samsung, 3GPP TSG-RAN WG1 Meeting #61, Montreal, Canada, May 10-14, 2010, 7 pages.
3rd Generation Partnership Project (3GPP), R1-103090, "CQI/PMI/RI Reporting for Carrier Aggregation", Huawei, 3GPP TSG RAN WG1 Meeting #61, Montreal, Canada, May 10-14, 2010, 6 pages.
3rd Generation Partnership Project (3GPP), R1-103783, "On the PUCCH Resource Allocation and A/N Codebook Size for Carrier Aggregation", Nokia Siemens Networks, Nokia, 3GPP TSG RAN WG1 Meeting #61bis, Dresden Germany, Jun. 28-Jul. 2, 2010, 3 pages.
3rd Generation Partnership Project (3GPP), R1-103790, "On the Need for Cross-Carrier A/N Bundling", Nokia Siemens Networks, Nokia, 3GPP TSG RAN WG1 Meeting #61bis, Dresden, Germany, Jun. 28-Jul. 2, 2010.
3rd Generation Partnership Project (3GPP), TR 36.814 V1.5.0, "Technical Specification Group Radio Access Network, Further Advancements for E-UTRA Physical Layer Aspects (Release 9)", Nov. 2009, pp. 1-53.
3rd Generation Partnership Project (3GPP), TS 36.211 V8.1.0, "Technical Specification Group Radio Access Network, Evolved Universal Terrestrial Radio Access (E-UTRA), Physical Channels and Modulation (Release 8)", Nov. 2007, pp. 1-54.
3rd Generation Partnership Project (3GPP), TS 36.211 V8.6.0, "Technical Specification Group Radio Access Network, Evolved Universal Terrestrial Radio Access (E-UTRA), Physical Channels and Modulation (Release 8)", Mar. 2009, pp. 1-82.
3rd Generation Partnership Project (3GPP), TS 36.212 V8.5.0, "Technical Specification Group Access Network, Evolved Universal Terrestrial Radio Access (E-UTRA), Multiplexing and Channel Coding (Release 8)", Dec. 2008, pp. 1-58.
3rd Generation Partnership Project (3GPP), TS 36.212 V8.6.0, "Technical Specification Group Radio Access Network, Evolved Universal Terrestrial Radio Access (E-UTRA), Multiplexing and Channel Coding (Release 8)", Mar. 2009, pp. 1-59.
3rd Generation Partnership Project (3GPP), TS 36.213 V8.5.0, "Technical Specification Group Radio Access Network, Evolved Universal Terrestrial Radio Access (E-UTRA), Physical Layer Procedures (Release 8)", Dec. 2008, pp. 1-74.
3rd Generation Partnership Project (3GPP), TS 36.213 V8.6.0, "Technical Specification Group Radio Access Network, Evolved Universal Terrestrial Radio Access (E-UTRA), Physical Layer Procedures (Release 8)", Mar. 2009, pp. 1-77.
3rd Generation Partnership Project (3GPP), TS 36.300 V8.10.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Sep. 2009, pp. 1-146.
3rd Generation Partnership Project (3GPP), TS 36.321 V8.6.0, "Technical Specification Group Radio Access Network, Evolved Universal Terrestrial Radio Access (E-UTRA) Medium Access Control (MAC) Protocol Specification (Release 8)" Jun. 2009, pp. 1-47.
3rd Generation Partnership Project (3GPP); TS 36.321 V8.4.0, "Technical Specification Group Radio Access Network, Evolved Universal Terrestrial Radio Access (E-UTRA) Medium Access Control (MAC) Protocal Specification (Release 8)", Dec. 2008, pp. 1-43.
Ghosh et al., "Uplink Control Channel Design for 3GPP LTE", 18th Annual IEEE International Symposium on Personal, Indoor, and Mobile Radio Communication (PIMRC'07), 2007, 5 pages.
Ibrahim, et al., "Study of Spread Codes With Block Spread OFDM", IEEE International Conference on Wireless Broadband and Ultra-Wideband Communications, Oct. 2009, 5 pages.
3rd Generation Partnership Project (3GPP), R1-060109, "Uplink Scrambling for E-UTRA", Ericsson, TSG-RAN WG1 LTE AdHoc, Helsinki, Finland, Jan. 23-25, 2006, 3 pages.
3rd Generation Partnership Project (3GPP), R1-060111, "Uplink Control Signaling for E-UTRA", Ericsson, TSG-RAN WG1 LTE AdHoc, Helsinki, Finland, Jan. 23-25, 2006, 4 pages.
3rd Generation Partnership Project (3GPP), R1-070127, "Performance of UE-Specific Scrambling for E-UTRA Uplink", Samsung, 3GPP TSG RAN WG1 Meeting #47bis, Sorrento, Italy, Jan. 15-19, 2007, 8 pages.
3rd Generation Partnership Project (3GPP), R1-074413, "Variable Phase Definition of the Reference Signal for CQI in PUCCH", Panasonic, 3GPP TSG RAN WG1 Meeting #50bis, Shanghai, China, Oct. 8-12, 2007, 6 pages.
3rd Generation Partnership Project (3GPP), R1-074812, "On PUCCH Structure for CQI Report", NTT DoCoMo, Nokia Siemens Networks, Nokia, Mitsubishi Electric, Toshiba Corporation, 3GPP TSG RAN WG1 Meeting #51, Jeju, Korea, Nov. 5-9, 2007, 8 pages.

(56) References Cited

OTHER PUBLICATIONS

3rd Generation Partnership Project (3GPP), R1-081799, "Configuration of CQI, PMI, RI Elements", Panasonic, 3GPP TSG-RAN WG1 Meeting #53, Kansas City, USA, May 5-9, 2008, 3 pages.
3rd Generation Partnership Project (3GPP), R1-081966, "Further Details on UL ACK/NAK Resource Allocation", Qualcomm Europe, 3GPP TSG RAN1 #53, Kansas City, US, May 5-9, 2008, 4 pages.
3rd Generation Partnership Project (3GPP), R1-081988, "Support of Multiple ACK/NAK Transmission in TDD", Texas Instruments, 3GPP TSG RAN WG1 #53, Kansas City, MO, USA, May 5-9, 2008, 3 pages.
3rd Generation Partnership Project (3GPP), R1-082660, "On Remaining Issues of PUCCH Slot Based CS/OC Remapping", Texas Instruments, Samsung, Panasonic, ZTE, LGE, 3GPP TSG RAN WG1 #53b, Warsaw, Poland, Jun. 30-Jul. 4, 2008, 3 pages.
3rd Generation Partnership Project (3GPP), R1-082731, "Joint Way Forward on the ACK/NACK Scrambling for PUCCH", Panasonic, Samsung, Texas Instruments, NTT DoCoMo, Mitsubishi, KDDI, Sharp, Fujitsu, 3GPP TSG RAN WG1 Meeting #54, Warsaw, Poland, Jun. 30-Jul. 4, 2008, 3 pages.
3rd Generation Partnership Project (3GPP), R1-083176, "UL ACK/NACK Assignment Procedure", Qualcomm Europe, 3GPP TSG-RAN WG1 #54, Jeju, S. Korea, Aug. 18-22, 2008, 8 pages.
3rd Generation Partnership Project (3GPP), R1-090724, "UL Control Signalling to Support Bandwidth Extension in LTE-Advanced", Nokia Siemens Networks, Nokia, 3GPP TSG RAN WG1 Meeting #56, Athens, Greece, Feb. 9-13, 2009, 5 pages.
3rd Generation Partnership Project (3GPP), R1-093350, "Weighted CSI Feedback Aided DL CoMP Transmissions", Alcatel-Lucent Shanghai Bell, Alcatel-Lucent, 3GPP TSG-RAN WG1 #58, Shenzhen, China, Aug. 24-28, 2009, 8 pages.
3rd Generation Partnership Project (3GPP), R1-093778, "Comparison of CSI Feedback Schemes", Alcatel-Lucent, Alcatel-Lucent Shanghai Bell, 3GPP TSG-RAN WG1 #58, Miyazaki, Japan, Oct. 12-16, 2009, 8 pages.
3rd Generation Partnership Project (3GPP), R1-094130, "Multi-Channel Transmission for UL ACK/NACK in LTE-A", CATT, 3GPP TSG RAN WG1 meeting #58 bis, Miyazaki, Japan, Oct. 12-16, 2009, 3 pages.
3rd Generation Partnership Project (3GPP), R1-094163, "Uplink ACK/NACK Transmission in LTE-Advanced", LG Electronics, 3GPP TSG RAN WG1 #58bis, Miyazaki, Japan, Oct. 12-16, 2009, 6 pages.
3rd Generation Partnership Project (3GPP), R1-094605, "Notion of Anchor Carrier for Asymmetric Bandwidth Extension", Alcatel-Lucent, Alcatel-Lucent Shanghai Bell, 3GPP TSG-RAN WG1 #59, Jeju, Korea, Nov. 9-13, 2009, 5 pages.
3rd Generation Partnership Project (3GPP), R1-095019, "Downlink MU-MIMO and Related Feedback Support", Texas Instruments, 3GPP TSG RAN WG1 59, Jeju, Korea, Nov. 9-13, 2007, 7 pages.
3rd Generation Partnership Project (3GPP), R1-100917, "Method for Multiple ACK.NACK Transmission on PUCCH", Alcatel-Lucent Shanghai Bell, Alcatel-Lucent, 3GPP TSG-RAN WG1 #60, San Francisco, USA, Feb. 22-26, 2010, 5 pages.
3rd Generation Partnership Project (3GPP), R1-100918, "A/N. Resource Allocation for PUCCH", Alcatel-Lucent, Alcatel-Lucent Shanghai Bell, 3GPP TSG-RAN WG1 #60, San Francisco, USA, Feb. 22-26, 2010, 5 pages.
3rd Generation Partnership Project (3GPP), R1-105858, "Periodic CSI Reporting for CA", Ericsson, ST-Ericsson, 3GPP TSG RAN WG 1 Meeting #63, Jacksonville, USA, Nov. 15-19, 2010, 3 pages.
3rd Generation Partnership Project (3GPP), R1-106064, "Periodic CQI/PMI/RI Reporting for Carrier Aggregation", Panasonic, 3GPP TSG-RAN WG 1 Meeting 63, Jacksonville, USA, Nov. 15-19, 2010, 3 pages.
3rd Generation Partnership Project (3GPP), R2-103257, "Scrambling Initialization in Carrier Aggregation", Samsung, 3GPP TSG RAN WG2 #70, Montreal, Canada, May 10-14, 2010, 6 pages.
3rd Generation Partnership Project (3GPP), TS 36.211 V8.8.0, "Technical Specification Group Radio Access Network, Evolved Universal Terrestrial Radio Access (E-UTRA), Physical Channels and Modulation (Release 8)", Sep. 2009, 83 pages.
3rd Generation Partnership Project (3GPP), TS 36.212 V8.7.0, "Technical Specification Group Radio Access Network, Evolved Universal Terrestrial Radio Access (E-UTRA), Multiplexing and Channel Coding (Release 8)", May 2009, 60 pages.

\* cited by examiner

CHANNEL STATE INFORMATION TRANSMISSION FOR MULTIPLE CARRIERS

CROSS-REFERENCE TO RELATED APPLICATIONS

This application is a continuation of U.S. Non-provisional application Ser. No. 12/987,647, filed Jan. 10, 2011, which claims the benefit of U.S. Provisional Application No. 61/293,412, filed Jan. 8, 2010, U.S. Provisional Application No. 61/329,743, filed Apr. 30, 2010, U.S. Provisional Application No. 61/356,400, filed Jun. 18, 2010, U.S. Provisional Application No. 61/356,449, filed Jun. 18, 2010, and U.S. Provisional Application No. 61/389,057, filed Oct. 1, 2010, all of which are hereby incorporated by reference herein.

BACKGROUND

In order to support higher data rate and spectrum efficiency, the Third Generation Partnership Project (3GPP) Long Term Evolution (LTE) system has been introduced into 3GPP Release 8 (R8) (LTE Release 8 may be referred to herein as LTE R8 or R8-LTE). In LTE, in order to schedule the downlink (DL) transmission, the eNodeB relies on Channel Quality Indicator (CQI) reports transmitted by the User Equipment (UE) in the uplink (UL). Two modes of CQI reporting may be supported in LTE, aperiodic and periodic.

LTE Advanced (which includes LTE Release 10 (R10) and may include future releases such as Release 11, also referred to herein as LTE-A, LTE R10, or R10-LTE) is a further evolution of the LTE standard that provides a 4G upgrade path for LTE and 3G networks. In LTE-A, carrier aggregation is supported, and, unlike in LTE, multiple component carriers (CCs) or serving cells may be assigned to the uplink, downlink, or both. Such carriers may be asymmetric. For example, different number of CCs may be assigned to the uplink than the number of CCs assigned to the downlink.

In LTE Release 8, channel state information (CSI) is designed to fit the operation of simple single component carrier. A CSI report may include CQI. With carrier aggregation, however, a wireless transmit receive unit (WTRU) may send a periodic channel quality report for multiple, such as for up to the maximum number of downlink CCs that may be conFIG.d for the WTRU, onto one WTRU-specific UL CC. Thus in LTE-A, the amount of periodic feedbacks to be transmitted by a UE may increase considerably compared to that of LTE Rel-8 on a given UL CC. Issues pertaining to periodic CSI reporting in carrier aggregation may easily be extended to aperiodic CSI reporting. For example, a UE may be expected to send an aperiodic channel quality report for multiple DL CCs onto one WTRU specific UL CC. However, current mechanisms may not accommodate the increased demand in periodic and aperiodic CSI reporting. For example, current mechanisms may not support transmitting CSI for multiple carriers over Physical Uplink Control Channel (PUCCH), transmit CSI over DFT-S-OFDM-based PUCCH, or multiplex certain CSI over PUCCH.

SUMMARY

Methods and systems for transmitting channel state information with carrier aggregation are disclosed. Periodic and aperiodic CSI information for multiple component carriers (CCs) or serving cells may be transmitted by a WTRU. In an embodiment, DL CSI may be reported for a subset of DL CCs or serving cells. For example, a DL CSI reporting component carrier set or a set of DL CSI reporting serving cells may be a subset of DL CCs or serving cells, and may include the set of DL CCs or serving cells conFIG.d by higher layer for which a periodic and/or aperiodic CSI reports may be scheduled to transmit in the UL.

In an embodiment, an indication to transmit a CSI report may be received, and which serving cell or set of serving cells to base the CSI report on may be determined based on the received indication. For example, the DL serving cell or set of DL CSI reporting serving cells may be determined based on a received DCI format or a received random access response grant. A CSI report for the determined DL serving cell or set of DL CSI reporting serving cells may be transmitted.

The CSI report may include Hybrid Automatic Repeat reQuest (HARQ) ACK/NACK report and Channel Quality Indicator (CQI)/Precoding Matrix Indication (PMI)/Rank Indication (RI) report. In an embodiment, HARQ ACK/NACK report and CQI/PMI/RI report may be transmitted separately. Separate transmission of ACK/NACK and CQI may be used when there are insufficient resources available in PUSCH to accommodate both ACK/NACK and CQI. For example, simultaneous transmission of PUCCH and PUSCH is permitted or conFIG.d. When a CQI/PMI/RI report and an ACK/NACK report coincide in a subframe, the HARQ ACK/NACK may be transmitted on PUCCH, and CQI/PMI/RI may be transmitted on PUSCH. In an embodiment, PUSCH resources may be allocated to accommodate ACK/NACK reports and CQI/PMI or RI reports, and ACK/NACK and CQI/PMI or RI reports may be jointly transmitted on PUSCH.

In an embodiment, resources on PUCCH may be allocated for transmitting CSI reports. For example, the number of resource blocks (RBs) allocated for a CSI report structure may be received. A schedule assigning the outer most RBs on the PUCCH for feedback transmission using the CSI structure may be received. CSI feedback may be transmitted in the number of outer most RBs in the CSI structure. These and additional aspects of the current disclosure are set forth in more detail below.

BRIEF DESCRIPTION OF THE DRAWINGS

For the purposes of illustration, are exemplary embodiments shown in the drawings; however, the subject matter is not limited to the specific elements and instrumentalities disclosed. In the drawings.

DETAILED DESCRIPTION OF ILLUSTRATIVE EMBODIMENTS

Figure 1A:
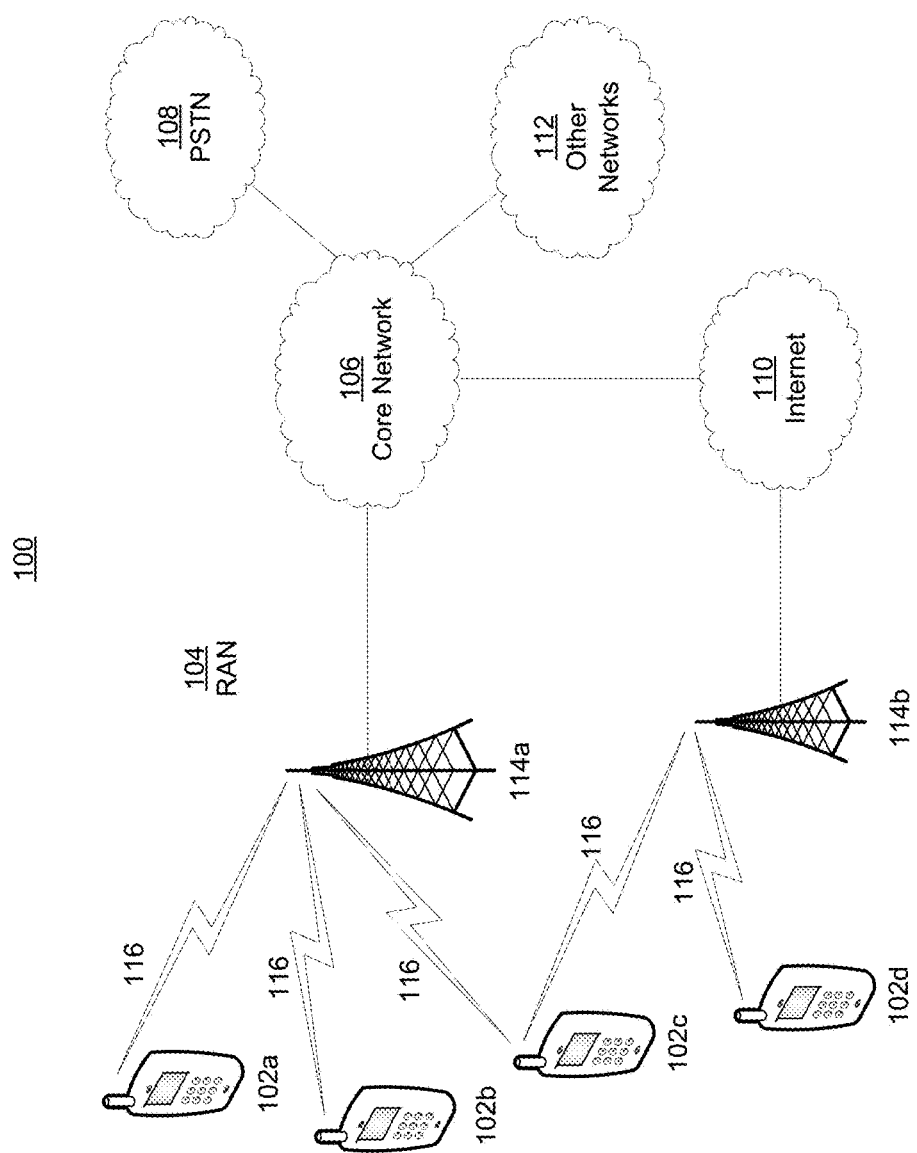
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device conFIG.d to operate and/or communicate in a wireless environment. By way of example, the WTRUs 102a, 102b, 102c, 102d may be conFIG.d to transmit and/or receive wireless signals and may include user equipment (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device conFIG.d to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be conFIG.d to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network conFIG.d to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be conFIG.d to communicate with the base station 114a, which may employ a cellular-based radio technology, and with the base station 114b, which may employ an IEEE 802 radio technology.

Figure 1B:
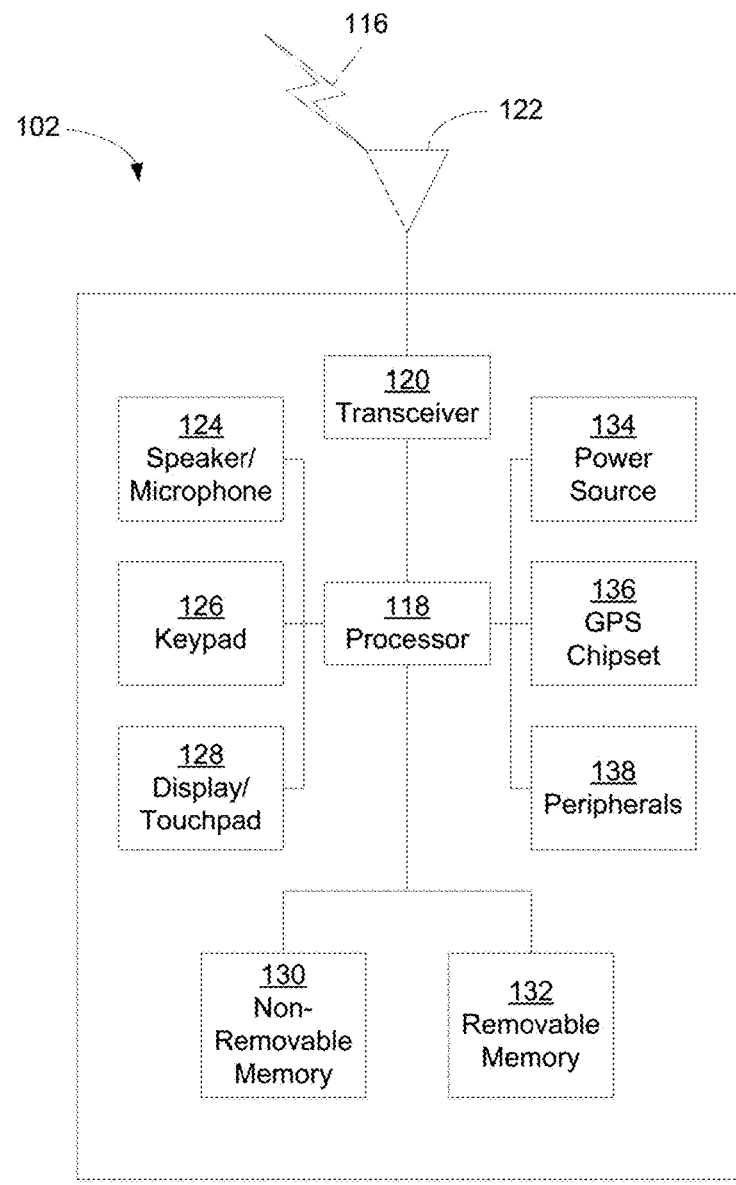
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be conFIG.d to transmit signals to, or receive signals from, a base station (e.g., the base station 114a) over the air interface 116. For example, in one embodiment, the transmit/receive element 122 may be an antenna conFIG.d to transmit and/or receive RF signals. In another embodiment, the transmit/receive element 122 may be an emitter/detector conFIG.d to transmit and/or receive IR, UV, or visible light signals, for example. In yet another embodiment, the transmit/receive element 122 may be conFIG.d to transmit and receive both RF and light signals. It will be appreciated that the transmit/receive element 122 may be conFIG.d to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be conFIG.d to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be conFIG.d to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be conFIG.d to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
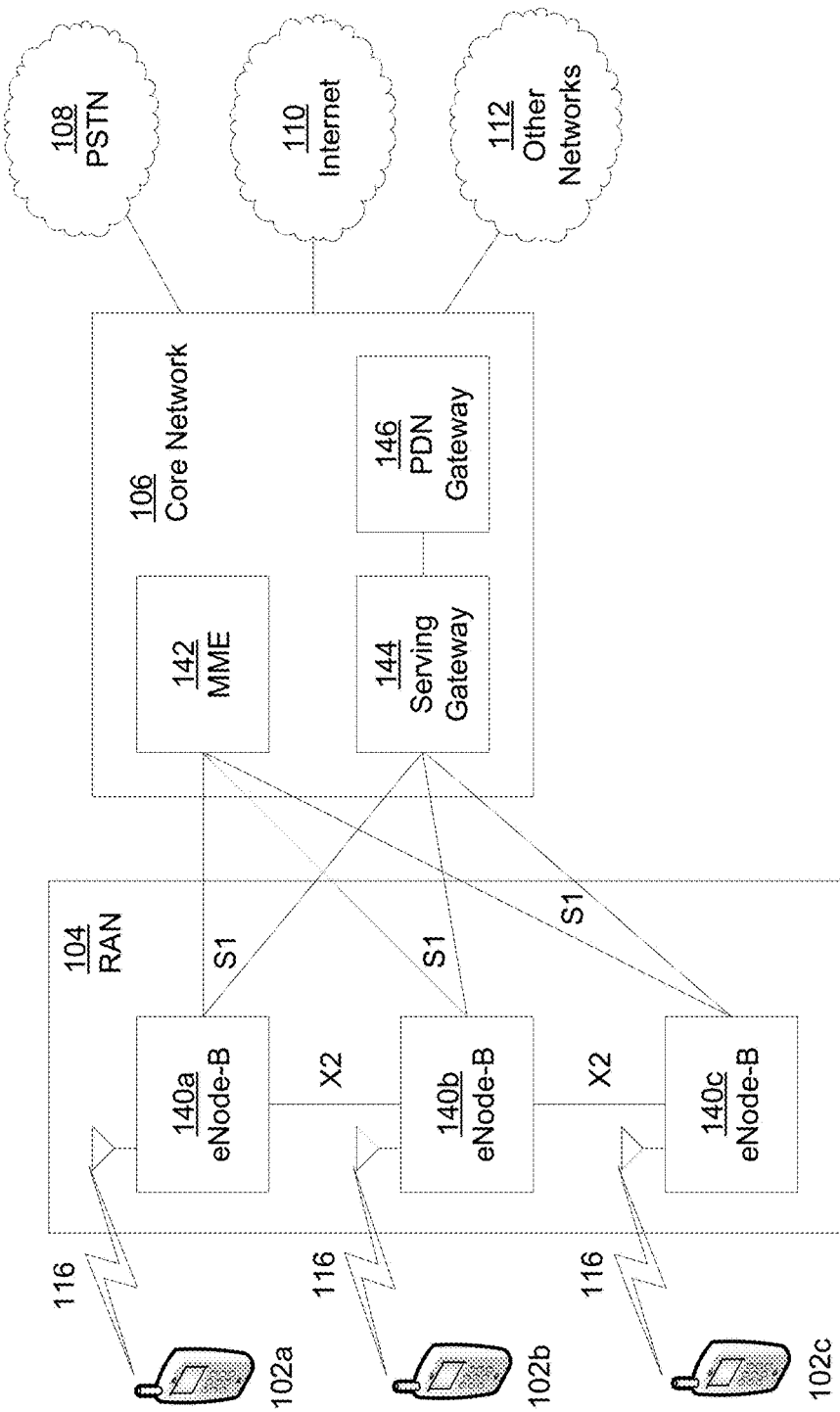
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be conFIG.d to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

To schedule the downlink (DL) transmissions, the eNodeB may rely on channel quality indicator (CQI) reports transmitted by the WTRU 102 in the uplink (UL). For MIMO transmissions, the WTRU 102 can be conFIG.d to transmit Multiple Input Multiple Output (MIMO)-related feedback together with the CQI report to assist the eNodeB in selecting an appropriate MIMO configuration for the DL transmissions. The MIMO-related feedback signalling may include Precoding Matrix Indication (PMI) and Rank Indication (RI).

CQI may be reported periodically or aperiodically. An Aperiodic CQI report may be transmitted on the Physical Uplink Shared Channel (PUSCH), while a periodic report may be transmitted on the Physical Uplink Control Channel (PUCCH) or on the PUSCH. When the WTRU 102 is allocated PUSCH resources in one of the periodic subframes, the periodic CQI report may be sent on the PUSCH. Moreover, the WTRU 102 can be conFIG.d to transmit both periodic and aperiodic reporting in the same subframe. When this occurs, the WTRU 102 may transmit the aperiodic report in that subframe. For example, in an embodiment, the WTRU 102 may transmit only the aperiodic report in that subframe.

CQI feedback modes or feedback types may be conFIG.d through higher layer signalling depending on how detailed the channel state feedback is either needed or requested at the eNodeB. For example, CQI feedback types may include wideband feedback, higher layer conFIG.d subband feedback, and/or WTRU-selected subband feedback. Table 1 summarizes example reporting modes for aperiodic CQI reporting.

TABLE 1

CQI and PMI Feedback Types for aperiodic reporting on PUSCH

| | | PMI Feedback Type | | |
|---|---|---|---|---|
| | | No PMI | Single PMI | Multiple PMI |
| PUSCH CQI Feedback Type | Wideband (wideband CQI) | | | Mode 1-2 |
| | WTRU Selected (subband CQI) | Mode 2-0 | | Mode 2-2 |

TABLE 1-continued

CQI and PMI Feedback Types for aperiodic reporting on PUSCH

| | PMI Feedback Type | | |
|---|---|---|---|
| | No PMI | Single PMI | Multiple PMI |
| Higher Layer-conFIG.d (subband CQI) | Mode 3-0 | Mode 3-1 | |

Wideband feedback may be conFIG.d when coarse channel information is required at the eNodeB. Also, when there are a large number of scheduled UEs, a wideband report may be used.

When a frequency selective report is needed or requested at eNodeB, the WTRU 102 can be conFIG.d to provide a subband-based feedback wherein a separate CQI, or PMI, may be reported for each sub-band. To reduce feedback overhead, a scheme based on the spatial differential CQI may be used. According to this scheme, for the PUCCH-based periodic reporting, the difference between the wideband CQIs of two codewords may be differentially encoded using 3-bits. For example, Codeword 1 offset level may be defined as wideband CQI index for codeword 0-wideband CQI index for codeword 1.

For PUSCH-based periodic reporting, the subband CQI values for each codeword may be encoded differentially with respect to their respective wideband CQI using 2 bits. For example, Subband differential CQI offset level may be defined as subband CQI index-wideband CQI index.

Figure 2:
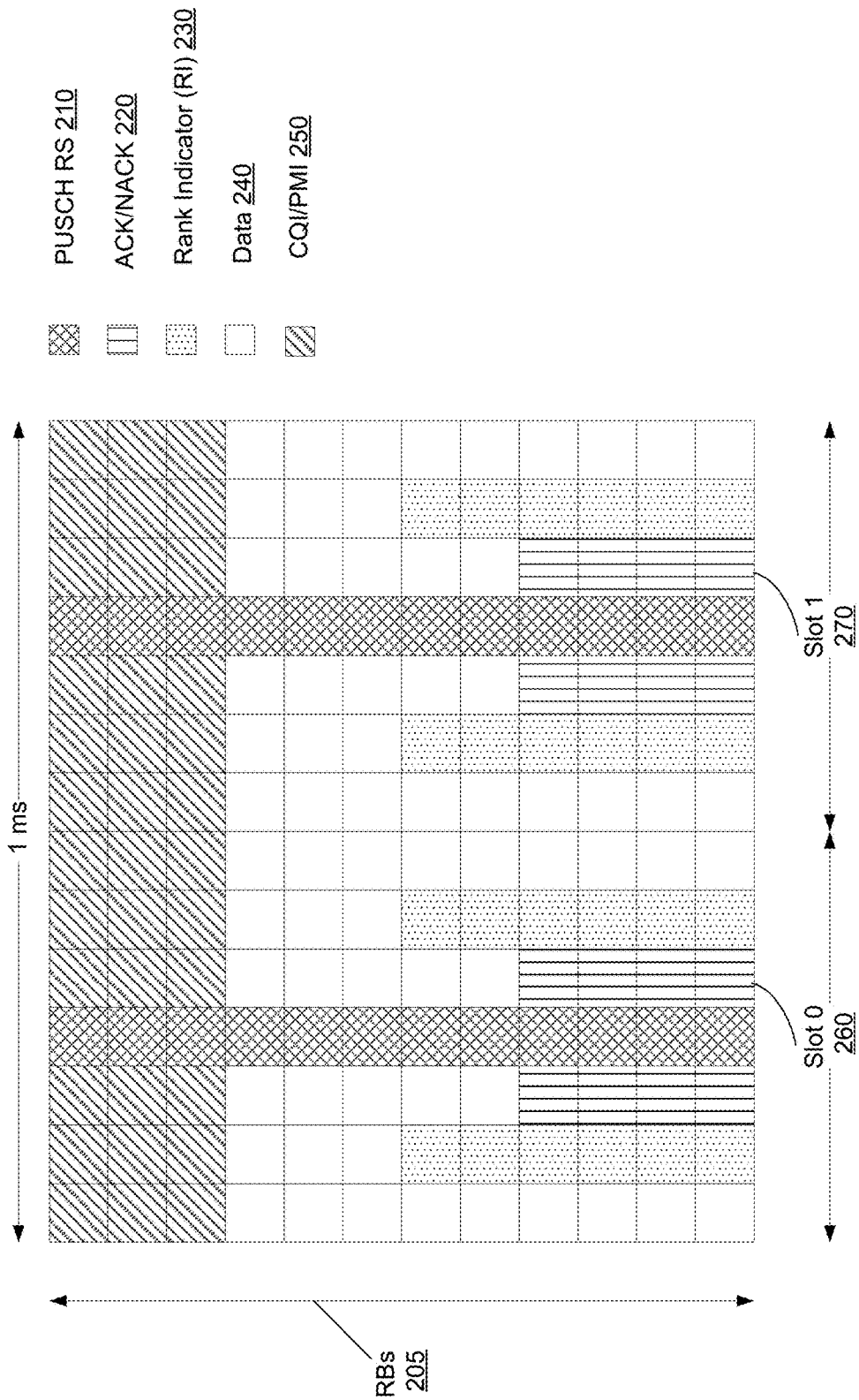
FIG. 2 illustrates an example mapping of CQI/PMI, RI, and/or HARQ ACK/NACK on PUSCH.

When the WTRU 102 has a valid scheduling grant in a subframe, in which the WTRU 102 may transmit control signalling, the control signalling may be time multiplexed with data on the PUSCH. Example mappings of CQI/PMI, RI and HARQ ACK/NACK on PUSCH are shown in FIG. 2. As shown, resource blocks (RBs) 205 may be transmitted over slot 0 206, and slot 1 270 over, for example, 1 ms. The HARQ ACK/NACK 220 may be transmitted on resources next to the PUSCH reference symbols (RS) 210. The RI 230 may be mapped next to the resources reserved for ACK/NACK 220 transmission. The coding of the ACK/NACK 220 and RI 230 may be based on repetition coding or simplex coding with optional circular repetition. In an embodiment, to meet the performance targets for ACK/NACK 220 and RI 230 transmissions, a substantial portion of PUSCH resources may be devoted to 1-bit or 2-bit ACK/NACK 220 and RI 230.

In case of collision between CQI/PMI/RI and ACK/NACK in a same subframe, CQI/PMI/RI may be dropped if the parameter simultaneousAckNackAndCQI provided by higher layers is set to FALSE. CQI/PMI/RI may be multiplexed with ACK/NAK otherwise. The periodic CQI report may be transmitted on the resource $n_{PUCCH}^{(2)}$ conFIG.d by higher layers and using PUCCH format 2/2a/2b. The number of reserved resource blocks (RBs) for PUCCH 2/2a/2b may be conFIG.d by the higher-layer parameter, $N_{RB}^{(2)}$, while the total number of RBs available for PUCCH transmission within the cell may be specified by the higher layer parameter, $N_{RB}^{HO}$.

Figure 3:
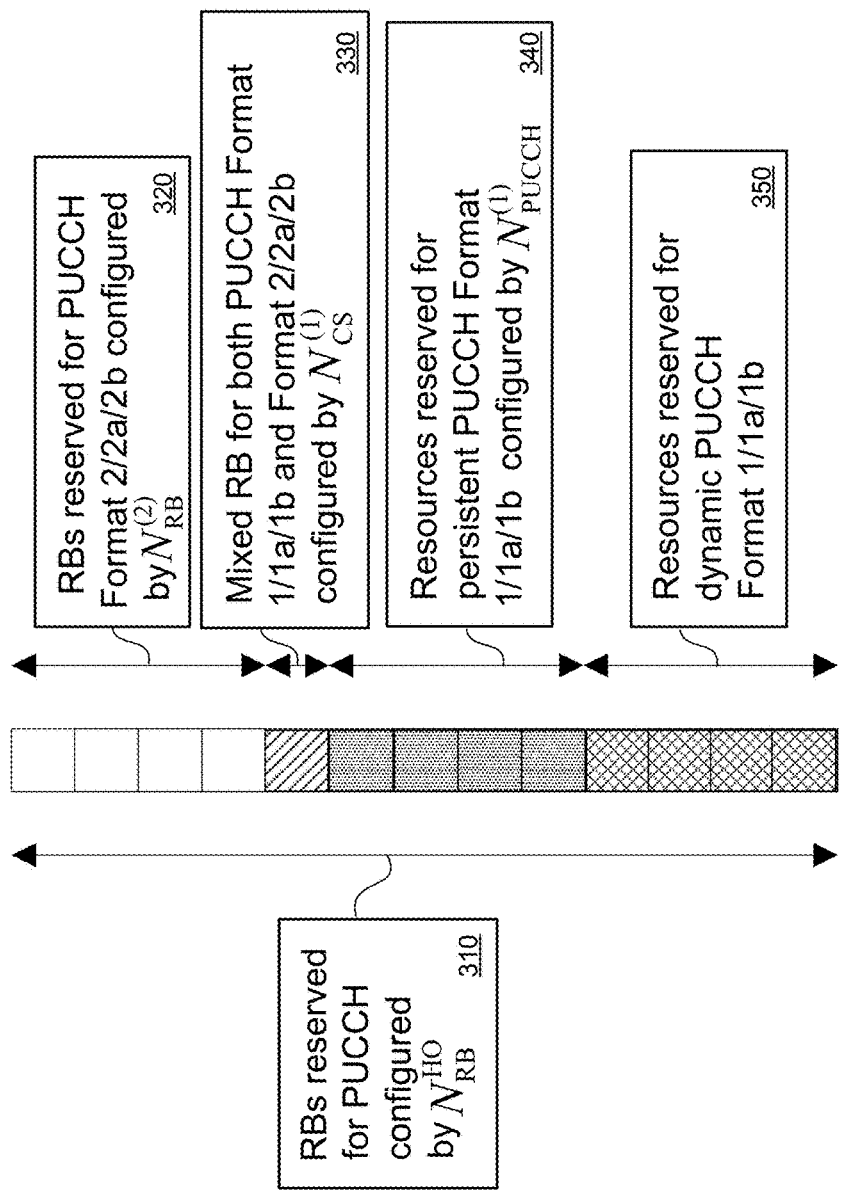
FIG. 3 shows an example PUCCH configuration.

FIG. 3 illustrates an example the PUCCH configuration. RBs 310 may be the RBs reserved for the PUCCH as conFIG.d by $N_{RB}^{HO}$. Among RBs 310, RBs 320 may be reserved for PUCCH format 2/2a/2b as conFIG.d by $N_{RB}^{(2)}$. Also among RBs 310, RB 330 may be a mixed RB that may be used for both PUCCH format 1/1a/1b and format 1/2a/2b, as may be conFIG.d by $N_{CS}^{(1)}$. Further among RBs 310, RBs 340 may be resources that may be reserved for persistent PUCCH format 1/1a/1b as conFIG.d by $N_{PUCCH}^{(1)}$. Also among RBs 310, RBs 350 may be resources reserved for dynamic PUCCH format 1/1a/1b. In an embodiment, for PUCCH format 1/1a/1b the resource index $n_{PUCCH}^{(1)}$ may determine the orthogonal sequence index and/or the corresponding value of the cyclic shift within each RB.

To maximize the bandwidth utilization, PUSCH and PUCCH may be transmitted in the same subframe simultaneously. This may avoid the bandwidth loss incurred by dropping the RBs reserved for PUCCH transmission when the WTRU 102 is scheduled for data transmission on the PUSCH in a given subframe. More specifically, by enabling the concurrent transmission of PUCCH and PUSCH in a subframe, the WTRU 102 can send control information on the PUCCH resources while data packets would be sent on PUSCH rather than multiplexing of control signalling and Uplink Shared Channel (UL-SCH) data on PUSCH. This may free up the PUSCH resources for data transmission.

Carrier aggregation, where two or more component carriers (CCs) are aggregated, may support wider transmission bandwidths, e.g. up to 100 MHz. CCs may also be referred to as serving cells, and the terms are used interchangeably herein. In an embodiment, a CC may include one or more serving cells. In an embodiment, a serving cell may include one or more CCs. Carrier aggregation may also be referred to as serving cell aggregation, and the terms are used interchangeably herein.

The WTRU 102 may aggregate a different number of CCs, or serving cells of different or same bandwidths in the UL and the DL. The set of DL CCs or set of DL serving cells on which a WTRU 102 may be scheduled to receive the Physical Downlink Shared Channel (PDSCH) in the DL may be conFIG.d by dedicated signaling.

Figure 4:
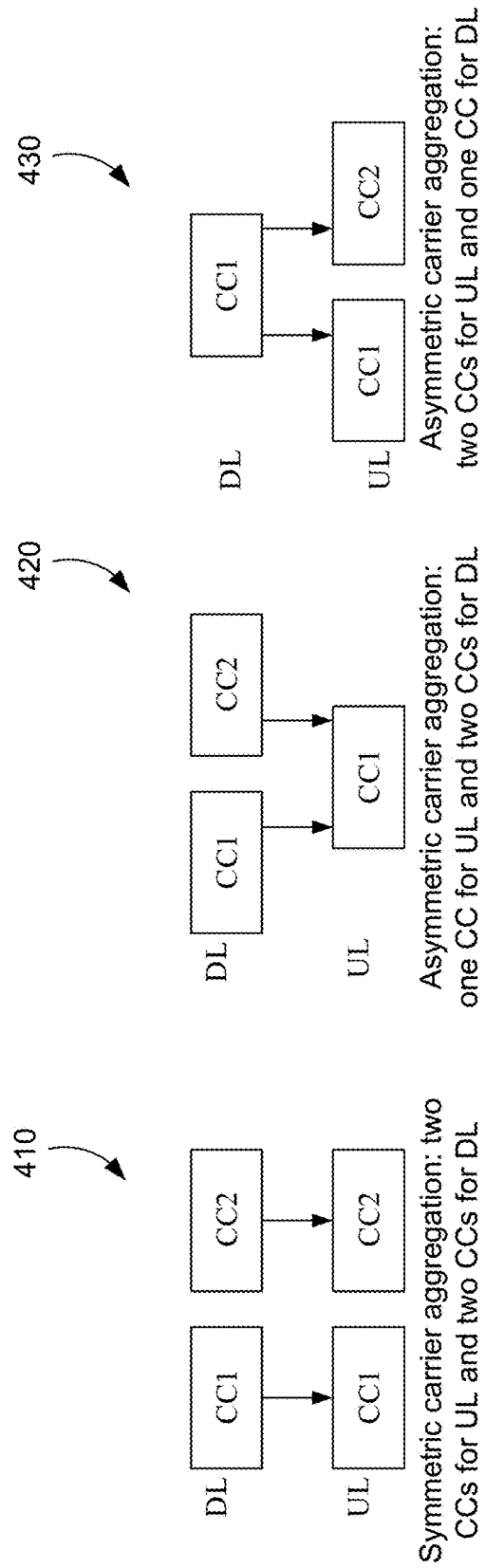
FIG. 4 shows example configurations for carrier aggregation.

Three example configurations for carrier aggregation are illustrated in FIG. 4. In configuration 410, symmetric carrier aggregation is illustrated, where there are the same number of component carriers used for both UL and DL. Configuration 420 illustrates the use of more DL component carriers than UL component carriers. In the illustrated example, two component carriers for DL are shown and one for UL. In configuration 430, the opposite scenario is shown, with two component carriers in used for UL and one for DL. Any other combination and number of component carriers for UL and DL are contemplated as within the scope of the present disclosure.

With carrier aggregation, channel state information (CSI) which may include CQI/PMI/RI may be fed back by the WTRU 102 for multiple CCs or multiple serving cells. In an embodiment, periodic CSI reporting for up to the maximum number of downlink CCs/serving cells that may be conFIG.d for the WTRU, may be supported. Periodic CSI reporting may be mapped onto a WTRU-specific UL CC semi-statically. For example, mapping of CSI reporting may be signaled via dedicated signaling or a higher layer signaling, such as RRC signaling.

CQI reporting of multiple CCs or multiple serving cells on a single UL CC may be implemented in several ways, such as cycling through both bandwidth parts and CCs or serving cells, reporting the wideband CQI, or best subband CQI, corresponding to multiple BW parts in a given CC, reporting the wideband CQI, or best subband, within a set of BW parts across multiple CCs or multiple serving cells, and/or reporting the CQIs for CCs or serving cells within WTRU DL CC set or set of DL serving cells in the same reporting instance.

Alternatives for the support of larger PUCCH CQI payload per reporting instance may include, but not limited to, using multiple PUCCH Format 2 resources, using PUSCH for periodic reporting, and/or using new CQI structures with increased payload size.

Extending CSI payload may be accomplished using a modified CSI structure. The increased CQI payload size can be realized by modification of the PUCCH or using PUSCH resources. Separate RBs may be allocated for the newly CQI structure, and backward compatibility may be maintained.

In an embodiment, DL CSI may be reported for a subset of DL CCs or serving cells to reduce reporting overhead. For example, a DL CSI reporting CC set or set of DL CSI reporting serving cells may be defined. CC set may also be referred to as set of serving cells, and the terms are used interchangeably herein. A WTRU DL CQI/PMI/RI reporting CC set may be defined to reduce the amount of feedback to be reported by the WTRU 102 for multiple CCs in a reporting instance. A CC set or set of serving cells may include a set of DL CCs or serving cells conFIG.d by dedicated signaling for which the WTRU 102 may be scheduled to transmit a periodic and/or aperiodic CSI report(s) in the UL. The CSI reporting CC set may include a subset of the WTRU DL component carrier set. The WTRU 102 may transmit CSI reports for a subset of the DL CCs or DL serving cells conFIG.d by dedicated signalling. For example, the WTRU 102 may transmit feedback for CCs/serving cells that may be part of the DL CSI reporting CC set or set of DL CSI reporting serving cells (RCCS).

The DL CSI RCCS may be conFIG.d by higher layer signalling. For example, higher layer may conFIG. DL CSI RCCS via a configuration parameter such as cqi-ReportComponentCarrierSet. The parameter may be included in IE CQI-ReportConfig as follows:

aperiodic CSI report in the UL. The aperiodic reporting CC set/set of serving cells may include a subset of the WTRU DL CC set/set of serving cells.

For example, when a detailed channel information feedback report for one or multiple CC(s) within a WTRU's conFIG.d CC set is not required at eNodeB, the WTRU 102 may be conFIG.d exclude those CCs' feedback in its aperiodic report to maximize the bandwidth utilization. For example, when the eNodeB experiences a large feedback overhead due to a large number of users in the system, the eNodeB may decide to limit the overhead by configuring a periodic report for a subset of CCs within each WTRU's conFIG.d DL CC set. This may enhance the flexibility at the eNodeB for reporting configurations.

Periodic and aperiodic CSI RCCS's may be conFIG.d by higher layer signaling, for example, via two configuration parameters such as cqi-ReportComponentCarrierSetPeriodic and cqi-ReportComponentCarrierSetAperiodic. For example, the parameters may be included in IE CQI-ReportConfig as follows:

```
CQI-ReportConfig_R10 ::=        SEQUENCE {
   cqi-ReportComponentCarrierSetPeriodic    BIT STRING (SIZE (5)) OPTIONAL,
   cqi-ReportComponentCarrierSetAperiodic   BIT STRING (SIZE (5)) OPTIONAL,
   cqi-ReportModeAperiodic       ENUMERATED {
                                 rm12, rm20, rm22, rm30, rm31,
                                 spare3, spare2, spare1} OPTIONAL,- Need OR
   nomPDSCH-RS-EPRE-Offset       INTEGER (-1..6),
   cqi-ReportPeriodic            CQI-ReportPeriodic OPTIONAL     -Need ON
}
```

The CSI RCCS may be conFIG.d via a bit map using, for example, five bits, assuming five component carriers are supported. The CSI RCCS may be conFIG.d using a predetermined number of bits depending on the number of DL conFIG.d component carriers.

In an embodiment, periodic and aperiodic reporting may be transmitted concurrently in the same subframe. For example, when both periodic and aperiodic reporting occur in the same subframe, both periodic and aperiodic reports may be transmitted in that subframe.

When both periodic and aperiodic reports are related to the same DL CC or serving cell, the WTRU 102 may transmit aperiodic report. The periodic report may be dropped. When periodic and aperiodic reports correspond to

```
CQI-ReportConfig_R10 ::=        SEQUENCE {
   cqi-ReportComponentCarrierSet  BIT STRING (SIZE (5))          OPTIONAL,
   cqi-ReportModeAperiodic        ENUMERATED {
                                  rm12, rm20, rm22, rm30, rm31,
                                  spare3, spare2, spare1} OPTIONAL,- Need OR
   nomPDSCH-RS-EPRE-Offset        INTEGER (-1..6),
   cqi-ReportPeriodic             CQI-ReportPeriodic OPTIONAL    - Need ON
}
```

In an embodiment, two separate DL RCCS's may be defined for different CSI reporting modes (e.g., one for periodic a reporting mode, and one for a aperiodic one). For example, the RCCS's may include a set of DL component carriers/serving cells conFIG.d by dedicated signaling for which the WTRU 102 may be scheduled to transmit a periodic CSI report in the UL. The periodic reporting CC set/set of serving cells may include a subset of the WTRU DL CC set. The RCCS's may include a set of DL component carriers/serving cells conFIG.d by dedicated signaling for which the WTRU 102 may be scheduled to transmit an different CCs/serving cells, the WTRU 102 may transmit both periodic and aperiodic reports in that subframe. The WTRU 102 may transmit a periodic feedback for one or more CC(s) within the component carrier set of the WTRU 102 while an aperiodic report may be transmitted for other CC(s) within the set.

Figure 5:
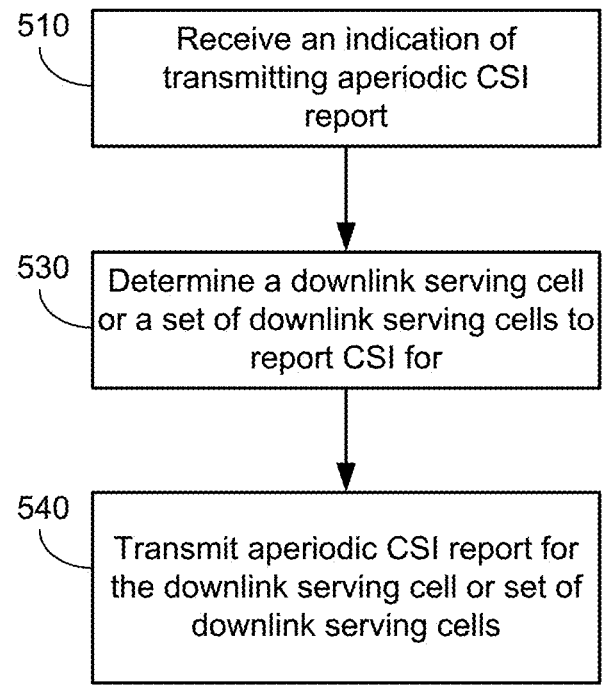
FIG. 5 illustrates an exemplary process for reporting channel state information with carrier aggregation.

FIG. 5 illustrates an exemplary method of reporting channel state information with carrier aggregation. As shown, at 510, an indication to transmit an aperiodic CSI report may be received. In an embodiment, a request for an aperiodic report of CSI information such as CQI, PMI and/or RI may be received. For example, the indication to transmit an aperiodic CSI report may be received in a subframe such as subframe n. In an example, the WTRU 102 may receive a downlink control information (DCI) format 0 in sub-frame n. A DCI format may grant resources for an uplink transmission on PUSCH. In the DCI format, the CQI request field may be set to 1. In an example, the WTRU 102 may receive a Random Access Response Grant in sub-frame n. In the Random Access Response Grant, the CQI request field may be set to 1 in the case of a non-contention based random access procedure. Based on the indication, the WTRU 102 may determine that the WTRU 102 should perform aperiodic CQI, PMI, and/or RI reporting on PUSCH in a subframe, such as subframe n+k. In an embodiment, k may equal to 4 for FDD.

As shown in FIG. 5, at 530, a serving cell or a set of serving cells for which CSI may be reported may be determined. The WTRU 102 may determine the serving cell or set of serving cells for which CQI, PMI, RI or any combination thereof may be reported according to at least one of the following methods. For example, the determination may be based on the received indication, such as the content of the received DCI or the received.

In an embodiment, the DL serving cell or set of DL serving cells may be determined upon decoding the indication received in subframe n. As described above, the indication received may include an uplink DCI format, and/or a Random Access Response Grant. The DL serving cell or set of DL serving cells may be determined based on the UL grant contained in the received DCI format or in the received Random Access Response Grant. For example, the DL serving cell or set of DL serving cells may include the serving cell(s) of the PUSCH transmission indicated by the UL grant, e.g. in the received uplink DCI format or the received Random Access Response Grant. For example, the received uplink DCI format or the received Random Access Response Grant may include a field such as a CSI request field, a CQI request field or the like. The field may include a value indicative of whether aperiodic CSI report is triggered, and/or the DL serving cell or set of DL serving cells for which CSI report is triggered.

For example, the DL serving cell or set of DL serving cells may correspond to DL serving cell(s) associated with a UL serving cell(s) for which the UL grant may apply. The UL serving cell(s) may include a Pcell and/or a Scell. The association may be provided by higher layer (RRC) signaling, and may be indicated either in a dedicated way or broadcast in the system information (SIB2 linking) of the DL serving cell(s).

In an embodiment, the UL grant signaled by the DCI may not result in an actual transmission. For example, the UL grant signaled by the DCI may correspond to a non-conFIG.d UL serving cell(s). The UL grant signaled by the DCI may have the same fields as a grant indicating transmission of uplink control information (UCI) without UL-SCH data, or without transport block. For example, the fields may include values such that IMCS=29 and NPRB<=4. The UL grant signaled by the DCI may have fields set according to specific values to indicate that the purpose of the grant is the indication of a DL serving cell set of DL serving cells for which CSI is to be reported. For instance, the fields may include values such that NPRB=0. When the UL grant signaled by the DCI does not result in an actual transmission, the CSI (along with the other UL control information) may be transmitted in another UL serving cell(s) according to a pre-determined rule. The rule may be the same rule as when the UCI that may include ACK/NACK feedback (e.g., include in PUSCH of Pcell if present). In case the WTRU 102, in a given subframe, detects UL grant(s) that may not correspond to an actual transmission, the WTRU 102 may not report any aperiodic CSI in PUSCH in subframe n+k.

In an embodiment, the DL serving cell or set of DL serving cells may correspond to for example, e.g. Pcell and/or Scell, for which the UL grant contained in the DCI format or in the random access response may apply. In an embodiment, the DL serving cell or set of downlink serving cells may correspond to the DL serving cell(s) of the Physical Downlink Control Channel (PDCCH) on which the DCI format or random access response may be decoded. This may apply to DCI formats, or to DCI formats that may not a carrier indication field (CIF). In an embodiment, the DL serving cell or set of DL serving cells may correspond to the DL serving cell(s) of the Physical Downlink Shared Channel (PDSCH) on which the random access response may be decoded. In an example method, the DL serving cell or set of DL serving cells may be determined based on the decoding location of the DCI format according to defined carrier-specific or serving cell-specific search space(s).

The conFIG.d DL serving cells, or a subset of conFIG.d serving cells for which CSI is reported in an aperiodic report, may be conFIG.d by higher layers. For example, the subset of DL serving cells for which reporting is performed may correspond to the subset of conFIG.d DL serving cells for which no periodic CSI reporting is performed.

In an example method, a set of subframes may be defined for the DL serving cell or set of DL serving cells for which a CSI report may be transmitted. The set of subframes may be defined using subframe numbers, frame numbers or a combination thereof, along with other parameters that may be conFIG.d by higher layers. For instance, in the case of N conFIG.d carriers/serving cells, the set of subframes for the jth DL serving cell may be defined as subframes satisfying (10 Nf+Ns+offset) modulo N=j where Nf is the system frame number, Ns is the subframe number and offset is a parameter conFIG.d by higher layers. For example, the WTRU 102 may transmit a CSI report for a DL serving cell, if the subframe in which the indication to transmit the aperiodic report is received, belongs to the set of subframes defined for the DL serving cell. For example, the WTRU 102 may transmit a CSI report for a DL serving cell, if the subframe in which the aperiodic report is to be transmitted belongs to the set of subframes defined for the DL serving cell. In the case of two DL serving cells, CSI report for one serving cell may be transmitted if the aperiodic report is transmitted in an even subframe, and CSI report for the other serving cell may be transmitted if the aperiodic report is transmitted in an odd subframe.

In an example method, the DL serving cell or set of DL serving cells may be determined based on an indication in the DCI format or in a random access response grant with the CQI request that may be received in subframe n. For example, this indication may be the carrier indication field (CIF) and/or the CSI Request field. The mapping between indication and the DL serving cell or set of DL serving cells may be provided by higher layers. For example, the DL serving cell may be directly indicated via the CIF field. The DL serving cell may be the DL serving cell associated to the UL carrier indicated by the CIF. A specific codepoint may indicate that the set of DL serving cell(s) to report may be determined using another method. For instance, upon reception of a specific codepoint, the WTRU 102 may determine the set of DL serving cells based on the subframe timing. In an embodiment, upon reception of a first specific codepoint for the CSI request field, the WTRU 102 may determine that the DL serving cell may include the serving cell of the PUSCH transmission indicated by the UL grant, for example, in an uplink DCI format or a random access response grant. In an embodiment, upon reception of a specific codepoint for the CSI request field, the WTRU 102 may determine that the set of serving cells may include a corresponding set conFIG.d by higher layers.

The indication for DL serving cell or set of DL serving cells may also be conveyed by reusing or replacing a field, or a subset of bits or codepoints of a field in the DCI format. Re-interpretation may take place when the "CQI request field" that CSI is being requested. For instance, fields that may be reused or re-interpreted, alone or in combination, may include the "TPC command for scheduled PUSCH" field, the "Resource block assignment and hopping resource allocation" field, the "Modulation and coding scheme and redundancy version" field, and/or the "Cyclic shift for DM RS" field. In an embodiment, other control fields may also be reused or re-interpreted to indicate DL serving cell or set of DL serving cells for which CSI may be reported.

When a field is reused for the purpose of indicating the DL serving cell or the set of DL serving cell(s) to report for, the WTRU 102 may behave differently with respect to the functionality originally associated with this field. In an embodiment, the WTRU 102 may take no action with respect to the original functionality. For instance, in case of reuse of the TPC bits the WTRU 102 may refrain from applying any power control adjustment.

In an embodiment, the WTRU 102 may behave as if the value indicated by the reused field was a pre-defined value, or a value signaled by higher layers. For instance, in case the "Cyclic shift for DM RS" is reused, the WTRU 102 may behave as if the "cyclic shift for DM RS" field was set to "000" or to a value provided by higher layers. This value may also be dependent on the UL carrier to which the grant may apply.

In an embodiment, the WTRU 102 may behave as per the original interpretation, with respect to the existing functionality, for certain values of the received codepoint. For instance, in the case of the "resource block assignment and hopping resource allocation" field is reused, the WTRU 102 may interpret any codepoint that may have represented a valid assignment as per the original interpretation.

In an embodiment, a codepoint that may not correspond to a valid or defined codepoint with respect to the original functionality, may be mapped to a valid value or behavior. For instance, in the case of the "resource block assignment" field is reused, codepoints that do not represent a valid assignment as per the original interpretation may be mapped to a valid assignment. The WTRU 102 may re-interpret the field, or a subset of the bits thereof, according to a mapping related to the existing functionality. For example, in case the "TPC command for scheduled PUSCH" field is reused, the first bit of this field may still be interpreted by the WTRU 102 as a power adjustment value. In an embodiment, the WTRU 102 may associate a timing relationship with the interpretation of one or more of the fields.

The DL serving cell or set of DL serving cells may be determined based on whether the aperiodic request may be received in a random access response. For instance, in case the request is received in a random access response, the DL serving cell set may include the primary carrier or primary serving cell such as Pcell. The DL serving cell set may include the DL serving cell of the PDSCH on which the random access response may be decoded. The set of DL serving cells may include the DL serving cell(s) of conFIG.d cells, or activated cells. The set of DL serving cells may include the DL serving cell(s) of a subset of conFIG.d or activated cells that may be indicated by a field contained in the Random Access Response Grant.

In an embodiment, a subset of n DL serving cells may be determined. The number of the DL serving cells in the subset, n, may be defined or conFIG.d by higher layers. The subset of DL serving cells may include a DL serving cell for which the CQI is the highest among the DL serving cells. DL serving cells which are currently not in active time, or in a de-activated state, may be excluded from the sequence.

As shown in FIG. 5, at 540, a CSI report for the determined DL serving cell or set of DL serving cells may be transmitted. In an embodiment, a reporting order or sequence may be defined for the DL serving cells or sets of DL serving cells. The DL serving cell to report for may be determined by cycling through a defined order or sequence. For example, the DL serving cell or set of DL serving cells to be reported for may be defined as the next DL serving cell(s) in the sequence of, the DL serving cell last reported in an aperiodic report, the DL serving cell last reported in a periodic report, and/or the DL serving cell last reported in any report (periodic or aperiodic report). DL serving cells that may not be in active time, or in a de-activated state, may be excluded from the sequence.

More than one DCI's may request CSI reporting for serving cell(s) in one sub-frame. In an embodiment, the WTRU 102 may not report the CSI of any DL serving cell. For example, the WTRU 102 may consider a request that correspond to more than one DL serving cells as an error case. In an embodiment, the WTRU 102 may report the CSI of one DL serving cell, or one set of DL serving cells according to a DCI selected from a predetermined rule. For example, the DCI may be selected based on the DL serving cell where the DCI was decoded.

In an embodiment, the WTRU 102 may report the CSI of DL serving cells, or sets of DL serving cells, indicated by each DCI according to one or a combination of the previously described embodiments. In an embodiment, the WTRU 102 may not include the report for a DL serving cell at the subframe where the aperiodic request is received or in the subframe where the reporting is to be made, even if it would otherwise have according to one of the previous methods, when one or a combination of conditions are met as described later in the context of determining whether a DL serving cell should be excluded from CSI reporting.

The amount of information available for aperiodic CQI/PMI/RI reporting in a subframe may be limited by one or more factors. For example, information may be limited by a maximum number of DL serving cells for which reporting may be made, which may be signaled by higher layers. Information may be limited by a maximum number of information bits, or coded bits, or symbols, which may be a function of the modulation/coding scheme, number of resource blocks for PUSCH, grant, presence of HARQ-ACK information, or a combination thereof.

When an aperiodic report is to be transmitted for more than one DL serving cell, and the information is to be transmitted in more than one subframe, the WTRU 102 may determine the CQI/PMI/RI of which DL serving cell(s) may be reported. The WTRU 102 may determine which serving cell is to be dropped for the subframe, according to at least one priority rule that will be described below.

When an aperiodic report should be transmitted for more than one DL serving cell according to one of the above embodiments, and when due to a limitation such as the ones described in the above it is not possible to report all information in a subframe, the WTRU 102 may determine the CQI/PMI/RI of which serving cell(s) may be reported. The WTRU 102 may determine the CQI/PMI/RI of which serving cell(s) is to be dropped for the subframe, according to at least one priority rule described below.

In an embodiment, multiple CSI reports may be transmitted in a single subframe. For example, the CQI/PMI/RI information of more than one DL serving cell or component carrier may be reported in a subframe. The CSI reports may be concatenated first and then jointly encoded. The reports may be separately encoded and the coded bits/symbols may be concatenated. The identity of the DL serving cell or component carrier may be included along with the respective report when multiple reports are included into the same subframe.

In an embodiment, a predetermined order and/or location of each concatenated CSI report may be known to both the WTRU 102 and the eNB 140. The WTRU 102 may generate the CSI reports based on the predetermined order or location of the concatenated reports, and the receiving eNB 140 may process the CSI reports based on the predetermined order or location. In an embodiment, the corresponding identity of the DL serving cell or component carrier may not be included along with the respective report.

In an embodiment, when multiple CSI reports of more than one DL serving cell or component carrier are reported in a single subframe, information bits can be jointly encoded using tail biting convolutional coding (TBCC) encoding scheme. Other encoding schemes, such as Reed-Muller (RM) encoding scheme may also be used. In an embodiment, multiple encoding scheme may be used. TBCC may be more suitable for encoding large number of information bits, and RM may be more suitable when a small number of information bits are encoded. As such, combining multiple encoding schemes may improve performance.

In an embodiment, a triggering method for using different encoding schemes may be applied. Single threshold or multiple thresholds may be used to determine which encoding scheme(s) may be utilized.

In an embodiment, the total size of the multiple reports to be transmitted in a subframe may compared against a threshold value. For example, the WTRU may determine to use a particular encoding scheme such as TBCC when the size of information bits to be encoded equals to or exceeds the threshold value. When the size of information bits to be encoded exceeds threshold value is less or equals to the threshold value, the WTRU may determine to use a different encoding scheme such as RM. Multiple CSI reports for more than one DL serving cell or component carrier transmitted in a single subframe may be carried on PUSCH. In an embodiment, the PUSCH may carry control information when multiple CSI reports for more than one DL serving cell or component carrier transmitted in single subframe may be carried on the PUSCH. In an embodiment, the PUSCH may carry other information along with the CSI reports.

In an embodiment, the size of each of the multiple reports to be transmitted in a subframe may be compared against a threshold value. As described above, when multiple CSI reports of more than one DL serving cell or component carrier are reported in a single subframe, information bits can be separately encoded. Different CSI reports may be encoded using different encoding schemes. A single or multiple threshold-based triggering mechanism for encoding schemes may be applied to separate encoding of reports. For example, the WTRU 102 may determine to use a particular encoding scheme such as TBCC for a first report when the size of the first report exceeds the threshold value. The WTRU 102 may determine to use a particular encoding scheme such as RM for a second report when the size of the first report equals to or is less than the threshold value.

In an embodiment, the WTRU 102 may determine the DL serving cell or set of DL serving cells, for which periodic reporting of CQI/PMI/RI may be performed in a given subframe, along with the type of reports in this subframe. For example, the WTRU 102 may first determine, for each DL serving cell, the type of report (if any) that may be transmitted in a given subframe, subject to restrictions to be described later. For instance, there may be a separate periodic CQI reporting configuration (including indices determining periodicities and offsets of different types of report) with distinct parameter values for each DL serving cell. In an embodiment, the WTRU 102 may not include the report for a DL serving cell, even if it would otherwise have according to one of the previous methods, when one or a combination of conditions are met as described in the context of determining whether a DL serving cell should be excluded from CSI reporting.

In an embodiment, the WTRU 102 may determine that in this subframe reports for more than one DL serving cell may be transmitted. This could happen for instance if the reporting configurations for the periodic reporting of two DL serving cells are such that they are both conFIG.d to be reported in a particular subframe. The amount of information required to transmit these multiple reports may exceed the maximum amount of information that can be carried in this subframe (by e.g. a PUCCH or PUSCH resource assigned to the WTRU 102). The number of DL serving cells for which a report may be transmitted may exceed a defined maximum number of DL serving cells for which reports can be made in a single subframe. The WTRU 102 may transmit a subset of the reports initially determined for transmission into the subframe. The WTRU 102 may select the subset of report(s) that may be transmitted in the subframe according to at least one priority rule that will be described below. The identity of the DL serving cell may be included along with the respective report. The identity of the DL serving cell may be included along with the respective report when multiple reports are included into the same subframe.

Aperiodic reporting or periodic reporting may be prioritized based on one or more rules. For example, the priority between reports of different DL serving cells may be determined based on a priority order provided by higher layers. For instance, the order may be based on the order in the RRC configuration, or according to an explicit indication for each DL serving cell. For example, the report for the primary carrier (or serving cell), such as Pcell, may have higher priority than the secondary carriers such as Scells.

The priority between reports of different DL serving cells may be determined based on the type of report being transmitted for each DL serving cell. For instance, a Type 3 report that may carry RI feedback may have higher priority than a Type 1, Type 2 or Type 4 report that may carry subband CQI, wideband CQI/PMI and wideband CQI respectively. The report may then be prioritized such that the primary carrier (or serving cell), Pcell may have higher priority than the secondary carriers or Scells. A wideband CQI/PMI report may carry a higher priority than a subband CQI report. If simultaneous transmission of PUCCH and PUSCH is supported, a report on PUCCH may have a higher priority than a report on PUSCH in the same subframe.

The RI information may be prioritized over CQI/PMI information. Such prioritization may be performed before prioritization between DL serving cells.

The priority between reports of different DL serving cells may be determined based on the reporting mode conFIG.d for each DL serving cell, PUSCH CQI feedback Type, and/or PMI feedback type. For instance, carriers conFIG.d with reporting mode 1-2 may have higher priority than carriers conFIG.d with reporting mode 2-2. The priority between reports of different DL serving cells may be determined based on the transmission mode conFIG.d for each DL serving cell. The DL serving cells, for which a report may have been dropped in a previous subframe, and for which no report has been transmitted since then, may have higher priority than other DL serving cells. The priority between reports of different DL serving cells may be determined based on the time since an aperiodic report, a periodic report, or a periodic or aperiodic report is last transmitted for the DL serving cell. For instance, a DL serving cell for which a report has not been transmitted for a longer period of time may have higher priority. In an embodiment, the time since an aperiodic report for CQI, PMI, and/or RI may be different. For example, CQI and or PMI may be sent more frequently than RI.

The priority among reports of different DL serving cells may be determined based on the time since either a periodic or aperiodic report is sent for the Primary Carrier or Pcell. The priority may be based on the amount of change in CQI, PMI, and/or RI since the last transmission of a report for a DL serving cell. For instance, a DL serving cell for which the CQI has changed by a larger amount may have higher priority. The priority among reports of different DL serving cells or sets of serving cells may be determined based on a corresponding configuration index that may indicate periodicity and offset, such as the value of $I_{CQI/PMI}$. The configuration index $I_{CQI/PMI}$ may be provided by higher layers, and may include an index for a CQI/PMI report, given by a parameter such as parameter cqi-pmi-ConfigIndex. The priority among reports of different DL serving cells or serving cells may be determined based on a corresponding configuration index such as index $I_{RI}$. The configuration index $I_{RI}$ for a rank indication may be provided by higher layers, and may include an index for an RI report, given by a parameter such parameter ri-ConfigIndex. For instance, an (activated) serving cell or DL serving cell for which the value of $I_{CQI/PMI}$ may be highest among a set of (activated) serving cells or DL serving cells may have the highest priority. This may provide a prioritization criterion between serving cells or DL serving cells that are reported with the same periodicity but possibly different offsets.

The priority between reports of different DL serving cells may be determined based on the CQI value of each DL serving cell. For instance, a DL serving cell with a higher CQI may have higher priority. For example, when periodic CSI reports for multiple DL serving cells are to be transmitted, the respective CQI values of the DL serving cells may determine the priority of the reports. For example, the report for the DL serving cell may be reported if the CQI is above a threshold. This criterion may be applicable in the case of WTRU-selected sub-bands. For example, a DL serving cell for which a wideband CQI reference value may be applicable for a subsequent sub-band differential feedback report.

The priority between reports of different DL serving cells may be determined based on the amount of change in CQI/PMI/RI since the last transmission of a report for a DL serving cell. For instance, a DL serving cell for which the CQI has changed by a larger amount may have higher priority. The priority between reports of different DL serving cells may be determined based on the frequency bands that the DL serving cells belong to. For instance, the DL serving cells may be selected such that the number of frequency bands that DL serving cells reported for in the subframe may be maximized.

In an embodiment, multiple priority rules for the reporting of CQI/PMI/RI of different serving cells may be applied. For example, a priority rule based on the report type may be defined and applied at the same time as a priority rule based on serving cells. In an embodiment, the priority rule based on the report type may have higher precedence than the priority rule for the selection between different serving cells. For instance, RI may be scheduled to be reported in a subframe for a first serving cell, while CQI/PMI may be scheduled to be reported in the same subframe for a second serving cell. The RI of the first serving cell may have higher priority even if the first serving cell has lower priority than the second serving cell according to a cell prioritization rule. A cell prioritization rule may select the serving cell that is conFIG.d to be reported with the largest periodicity. In an embodiment, the cell prioritization rule may have higher precedence than the priority rule based on the report type. For instance, RI may be scheduled to be reported in a subframe for a secondary serving cell, while CQI/PMI may be scheduled to be reported in the same subframe for the primary serving cell. The CQI/PMI of the primary serving cell may have higher priority even if RI type has higher priority than CQI/PMI type according to the report type priority rule. In an embodiment, the cell prioritization rule may have higher precedence than the report type priority rule when one of the serving cells is the primary serving cell, and may have lower precedence than the report type priority rule when the serving cells are secondary cells.

In an embodiment, the WTRU 102 may determine whether a DL serving cell should be excluded from CSI reporting. For example, the WTRU 102 may exclude the CSI report for a DL serving cell that otherwise have reported, in the subframe where an aperiodic request is received, or in the subframe where periodic or aperiodic reporting of CQI/PMI/RI is to be made. For example, the WTRU 102 may exclude a DL serving cell from CSI reporting when the DL serving cell is not in active time, when the DL serving cell is in a de-activated state, when the period of time since a transmission (or new transmission) is received for this DL serving cell exceeds a threshold, and/or when the CQI, PMI, and/or RI has not changed by an amount higher (e.g. in absolute value) than a threshold since it was last reported for this DL serving cell. For an aperiodic report, the WTRU 102 may exclude a DL serving cell that has been conFIG.d for periodic CQI/PMI/RI reporting. The WTRU 102 may exclude a DL serving cell when the period of time since a report (periodic, aperiodic, or any report) has been transmitted for this DL serving cell is below a threshold (e.g. prohibit timer). This may be applicable to DL serving cells in de-activated state.

In an embodiment, payload ambiguity may be reduced or removed. For example, payload ambiguity may occur when sending an amount of CQI information unknown to the network. Payload ambiguity may be reduced or removed by padding bits to the CQI reports such that the number of transmitted CQI information bits may be predictable to the network. Payload ambiguity may be reduced or removed by pre-pending the CQI information with a size indicator field or a field indicating how many DL serving cells are reported, and/or by pre-pending or appending a cyclic redundancy check field to enable blind detection of the number of CQI information bits by the network.

In an embodiment, a transmission mode may be used to transmit wideband CQI-only reporting for carrier aggregation. A wideband CQI-only feedback mode for the aperiodic PUSCH-based reporting mode may include mode 1-0. For example, for a DL CC or serving cell, the WTRU 102 may calculate a wideband CQI value assuming transmission on the entire bandwidth of that CC or serving cell. The WTRU 102 may report the calculated CQI values (e.g., one CQI value per CC or serving cell) for DL CCs or serving cells conFIG.d by higher layer for which the aperiodic reports are required. A wideband CQI value may represent channel quality for the first codeword of the corresponding CC or serving cell, even when the Rank Indication (RI) for that CC or serving cell may be greater than one.

Transmission modes that may support the wideband CQI-only feedback mode for the aperiodic PUSCH-based reporting mode may include, but not limited to, transmission mode 1 such as single-antenna port, transmission mode 2 such as transmit diversity, transmission mode 3 such as open-loop spatial multiplexing, and/or transmission mode 7 such as WTRU-specific reference signals.

Table 2 shows an example field and a corresponding bit width for the CQI feedback using wideband reports for PDSCH transmissions associated with multiple DL CCs or serving cells according to Mode 1-0. $N_{CC}$ in Table 2 may denote the number of DL CCs or serving cells. As shown in Table 2, the bit width may be 4 DL CCs or serving cells for the CQI feedback using wideband reports for PDSCH transmissions associated with multiple DL CCs or serving cells according to Mode 1-0 for transmission modes 1, 2, 3 and 7. The number of DL CCs or serving cells may be conFIG.d by dedicated signaling for which the WTRU 102 may transmit an aperiodic feedback report.

TABLE 2

Field for channel quality information (CQI) feedback based on Mode 1-0 for transmission modes 1, 2, 3 and 7

| Field | Bit width |
|---|---|
| Wide-band CQI codeword | $4N_{CC}$ |

In an embodiment, a transmission mode may be used to transmit a combined wideband CQI and wideband PMI feedback for the aperiodic PUSCH-based reporting for carrier aggregation. For example, Mode 1-1 may be conFIG.d to support the combined reporting. For example, for a DL CC or serving cell, the WTRU 102 may select a single precoding matrix from the codebook subset. For a DL CC or serving cell, the WTRU 102 may calculate a wideband CQI value per codeword assuming the use of the corresponding selected precoding matrix, and transmission on the entire bandwidth of that CC or serving cell. The WTRU 102 may report the calculated CQI values for DL CCs or serving cells conFIG.d by higher layer for which the aperiodic reports that may be required. For example, one CQI may be reported per CC or serving cell. The WTRU 102 may report the selected PMI for DL CCs or serving cells conFIG.d by higher layer for which the aperiodic reports that may be required. For example, one PMI may be reported per CC or serving cell.

In an embodiment, the combined wideband CQI and wideband PMI reporting mode such as Mode 1-1 may be supported on PUSCH. For example, transmission modes that may support Mode 1-1 may include transmission mode 4 for closed-loop spatial multiplexing, and/or transmission mode 6 for closed-loop Rank-1 precoding.

Table 3 shows example fields and corresponding bit widths for the CQI feedback for wideband reports for PDSCH transmissions associated with multiple DL CCs or serving cells according to Mode 1-1.

TABLE 3

Fields for channel quality information (CQI) feedback based on Mode 1-1 for transmission modes 4 and 6

| | Bit width | | | |
|---|---|---|---|---|
| | 2 antenna ports | | 4 antenna ports | |
| Field | Rank = 1 | Rank = 2 | Rank = 1 | Rank >1 |
| Wide-band CQI codeword 0 | $4 N_{CC}$ | $4 N_{CC}$ | $4 N_{CC}$ | $4 N_{CC}$ |
| Wide-band CQI codeword 1 | 0 | $4 N_{CC}$ | 0 | $4 N_{CC}$ |
| Wide-band PMI | $2 N_{CC}$ | $N_{CC}$ | $4 N_{CC}$ | $4 N_{CC}$ |

In an embodiment, a wideband spatial differential CQI approach may be applied to the second codeword in one or more CCs or serving cells for PUSCH-based reporting. This approach may optimize the aperiodic feedback overhead using carrier aggregation with CQI Feedback Mode 1-1 and Transmission Mode 4. The wideband CQI value for the second codeword corresponding to the PDSCH transmission on a given DL CC or serving cell may be encoded differentially with respect to the CQI of the first codeword using N-bits, where N may be 3.

Table 4 shows example fields and corresponding bit widths for CQI feedback for wideband reports according to Mode 1-1 with a wideband spatial differential CQI.

TABLE 4

Fields for channel quality information (CQI) feedback based on Mode 1-1 using a wideband spatial differential CQI scheme

| | Bit width | | | |
|---|---|---|---|---|
| | 2 antenna ports | | 4 antenna ports | |
| Field | Rank = 1 | Rank = 2 | Rank = 1 | Rank >1 |
| Wide-band CQI codeword 0 | $4 N_{CC}$ | $4 N_{CC}$ | $4 N_{CC}$ | $4 N_{CC}$ |
| Wide-band CQI codeword 1 | 0 | $3 N_{CC}$ | 0 | $3 N_{CC}$ |
| Precoding matrix indication | $2 N_{CC}$ | $N_{CC}$ | $4 N_{CC}$ | $4 N_{CC}$ |

Table 5 shows example CQI and PMI feedback types for aperiodic reporting on PUSCH according to Mode 1-1.

TABLE 5

CQI and PMI Feedback Types for aperiodic reporting on PUSCH

| | | PMI Feedback Type | | |
|---|---|---|---|---|
| | | No PMI | Single PMI | Multiple PMI |
| PUSCH CQI Feedback Type | Wideband (wideband CQI) | Mode 1-0 | Mode 1-1 | Mode 1-2 |
| | WTRU Selected (subband CQI) | Mode 2-0 | | Mode 2-2 |
| | Higher Layer-conFIG.d (subband CQI) | Mode 3-0 | Mode 3-1 | |

In carrier aggregation, a reporting mode may include CQI values for two or mode DL CCs or serving cells. For example, there may be two DL CCs or serving cells, a primary carrier such as Pcell, and a secondary carry such as Scell. The codeword index may be computed. For example, the a M-bit wideband spatial differential CQI value for codeword 0 of the primary carrier ($C_0P$), and codeword 0 of the secondary carrier ($C_0S$), and codeword 1 of the primary carrier ($C_1P$), may be computed as follows. If the primary carrier has two codewords and the secondary carrier has one codeword then, $$C_1P \text{ carrier offset level} = \left\lceil \frac{((\text{wideband } CQI \text{ index for } C_oP) + (\text{wideband } CQI \text{ index for } C_0S))}{2} \right\rceil - \text{wideband } CQI \text{ index for } C_1P$$

If both the primary carrier and secondary carrier has two codewords then, $$C_1P \text{ carrier offset level} = \left\lceil \frac{((\text{wideband } CQI \text{ index for } C_oP) + (\text{wideband } CQI \text{ index for } C_0S))}{2} \right\rceil - \left\lceil \frac{((\text{wideband } CQI \text{ index for } C_1P) + (\text{wideband } CQI \text{ index for } C_1S))}{2} \right\rceil$$

The computation described above may be generalized to a primary carrier and two or more secondary carriers.

A mapping of the offset value to a differential CQI value may be derived from a table lookup an example of which is provided in Table 6 below,

TABLE 6

Mapping of spatial differential CQI value to offset value

| Spatial differential CQI value | Offset level |
|---|---|
| 0 | 0 |
| 1 | 1 |
| 2 | 2 |
| 3 | 3 |
| ... | ... |
| J | ≥J |
| K | ≤−K |
| ... | ... |
| 5 | −3 |
| 6 | −2 |
| 7 | −1 |

In an embodiment, there may be more than one mapping table for various combinations of DL serving cells, transmission modes, or the mapping could be derived using a suitable formulae.

In one embodiment, the WTRU 102 may be conFIG.d with at least one uplink resource allocation for the transmission of CSI reports only. For example, upper layers such as RRC may conFIG. the resource allocation via a semi-persistent uplink grant (hereafter a SPS-CSI grant). For example, the WTRU 102 may be allocated a dedicated resource for a PUSCH transmission such that the resource may be available for CSI transmission periodically. For example, the WTRU 102 may be allocated a dedicated resource for a PUSCH transmission such that dynamic scheduling using PDCCH may not be necessary for the WTRU 102 to perform the PUSCH transmission for CSI information.

The WTRU 102 may be conFIG.d with a SPS-CSI grant for at least one serving cell. For example, the conFIG.d SPS-CSI grant may be applicable to a transmission on the primary cell (PCell). For example, the conFIG.d SPS-CSI may be applicable to a transmission on a conFIG.d secondary cell (SCell). In an embodiment, the WTRU 102 may be conFIG.d with a plurality of SPS-CSI grants, for example, on the same serving cell (e.g. on the PCell), on the PCell and one or more SCells, or on multiple SCells. For example, the WTRU 102 may be granted with periodically reoccurring uplink transmission resources using one or more resource blocks (RBs) on the PUSCH of the PCell. The period for CSI reporting may equal to or be a multiple of the periodic of the conFIG.d grant(s) for CSI transmission. In a subframe for which the WTRU 102 has a valid SPS-CSI grant and for which a CSI report should be transmitted, the WTRU 102 may transmit the CSI report based on the SPS-CSI grant.

In an embodiment, the WTRU 102 may transmit CSI reports for subframes during Discontinuous Reception (DRX) active time. DRX is a function or operation mode that may allow the WTRU 102 to discontinuously monitor the PDCCH. For example, when DRX is conFIG.d, the WTRU 102 may monitor PDCCH during the DRX active time. The WTRU 102 may transmit CSI reports for subframes for which the WTRU 102 may monitor the PDCCH for other dynamic grants and/or assignments for the serving cell specified in the SPS-CSI grant. In an embodiment, the WTRU 102 may not transmit CSI for subframes that may not correspond to the DRX active time. For example, when DRX is conFIG.d and the WTRU 102 is not in DRX active time the WTRU 102 may not transmit SRS and may not report CQI/PMI/RI on the PUCCH.

The WTRU 102 may receive a configuration for the SPS-CSI grant by layer 3 signaling such as RRC. The WTRU 102 may start using the conFIG.d grant for CSI as soon as the grant is received, or after a pre-determined delay, or after subsequent control signaling is received that may activate the SPS-CSI grant and/or the CSI reporting. For example, the WTRU 102 may use the conFIG.d SPS-CSI grant when the WTRU 102 has a valid configuration for periodic CSI reporting. For example, the WTRU 102 may use the conFIG.d SPS-CSI grant once the SPS-CSI grant is activated, once the CSI reporting is activated, when in DRX active time if DRX is conFIG.d, and/or if there is at least one SCell activated.

The WTRU 102 may determine that the WTRU 102 may use or activate the conFIG.d SPS-CSI grant based on an indication from the reception of layer 1 signaling. For example, the WTRU 102 may use or activate the conFIG.d SPS-CSI grant based on a DCI scrambled with a specific RNTI. For example, the WTRU 102 may use or activate the conFIG.d SPS-CSI grant based on a DCI including an explicit indication that periodic CSI should be reported using the conFIG.d grant for CSI, if the DCI reception timing coincides with the subframe for which the conFIG.d grant would be applicable if activated. For example, the WTRU 102 may use or activate the conFIG.d SPS-CSI grant based on a DCI, if the timing of the transmission that corresponds to the grant received in the DCI would coincide with a subframe for which the conFIG.d grant for CSI transmission would be applicable if activated. In an embodiment, the indication is conveyed using the aperiodic CSI request bit in said DCI.

The WTRU 102 may determine that the WTRU 102 may use or activate the conFIG.d SPS-CSI grant from the reception of layer 2 signaling. For example, a MAC control element may be used to indicate that the grant may be activated. The WTRU 102 may determine that the WTRU 102 may stop using, such as deactivate the conFIG.d SPS-CSI grant from the reception of layer 1 control signaling or layer 2 control signaling similar to the control signaling described for the activation process.

In an embodiment, the WTRU 102 may determine that the WTRU 102 may stop using, such as deactivate the conFIG.d SPS-CSI grant, when the WTRU 102 determines that the radio link quality of either a primary cell (PCell) and/or the serving cell for which the conFIG.d SPS-CSI grant is applicable is below a certain threshold. For example, the WTRU 102 may stop using, such as deactivate the conFIG.d SPS-CSI grant, based on a determination that the downlink carrier used as the pathloss reference for the uplink carrier for which the conFIG.d SPS-CSI grant is applicable experiences physical layer problems and/or radio link failure. For example, the WTRU 102 may stop using, such as deactivate the conFIG.d SPS-CSI grant, based on a determination that the uplink carrier for which the conFIG.d SPS-CSI grant is applicable experiences physical layer problems and/or radio link failure such as following one or more failure to successfully complete the random access procedure. In an embodiment, the WTRU 102 may determine that the WTRU 102 may stop using, such as deactivate the conFIG.d SPS-CSI grant when the time alignment timer (TAT) applicable to the serving cell for which the SPS-CSI grant is applicable expires. The WTRU 102 may transmit HARQ A/N for the activation and/or deactivation control signaling.

The WTRU 102 may refrain from transmitting the CSI report on the conFIG.d grant for CSI if dynamic control signaling (e.g. PDCCH) is received. For example, the dynamic control signaling may grant uplink transmission resources in the same subframe and on the PUSCH of the serving cell for which the conFIG.d SPS-CSI grant also applies. The WTRU may drop the CSI report and transmit data on the dynamically scheduled uplink resources. The WTRU may transmit the CSI report or a portion of the CSI report on a different resource than the conFIG.d SPS-CSI resources, e.g. on the PUCCH or on a different PUSCH transmission including the transmission that would have other collided with the SPS-CSI grant.

In an embodiment, HARQ ACK/NACK report and CQI/PMI/RI report may be transmitted separately. Separate transmission of ACK/NACK on PUCCH and CQI on PUSCH may be used when there are not enough resources available in PUSCH to accommodate both ACK/NACK and CQI. For example, when a CQI/PMI/RI report and ACK/NACK coincide in a subframe, the HARQ ACK/NACK may be transmitted on PUCCH. Resources next to the reference symbols on the PUSCH that may be reserved for ACK/NACK signaling may be freed up. A larger channel status report may be transmitted on PUSCH at a reporting instance. CQI/PMI/RI may be transmitted on PUSCH.

Figure 6:
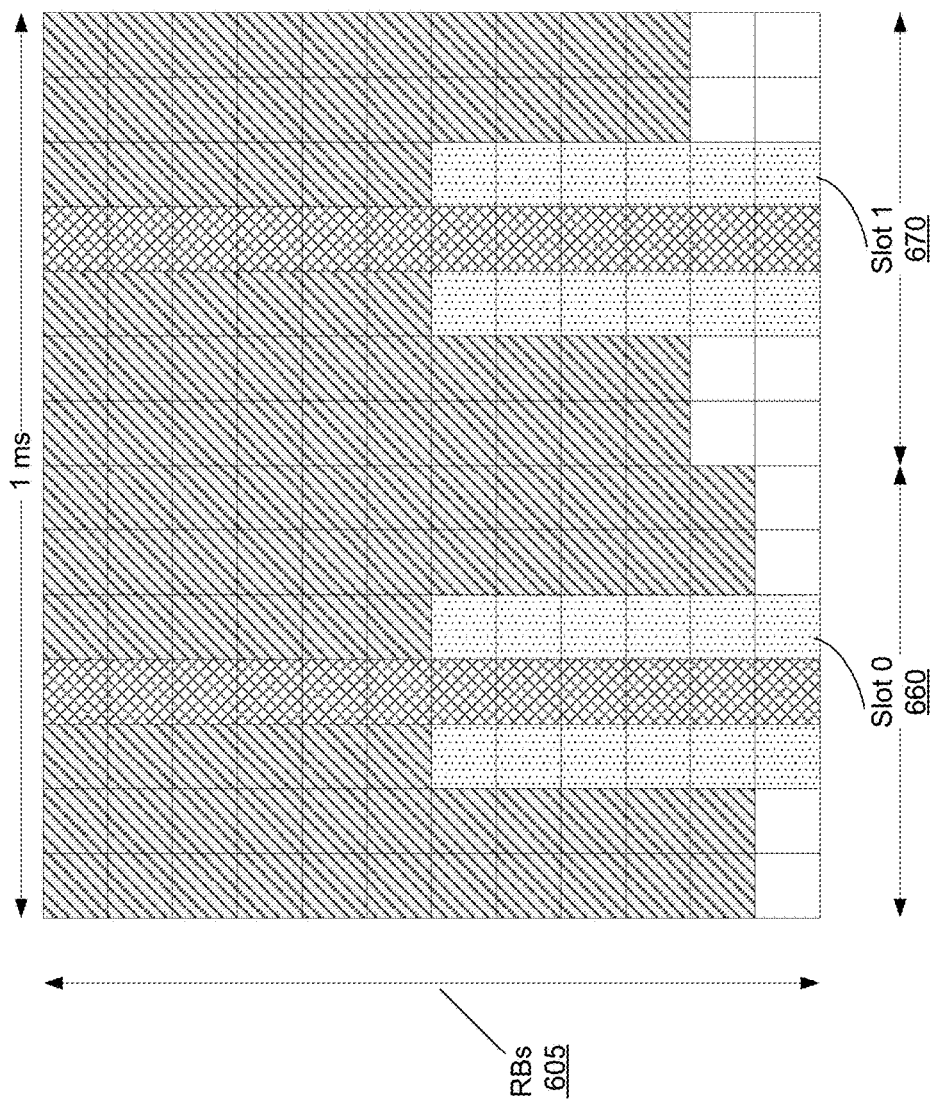
FIG. 6 shows an example mapping of CQI/PMI, RI and data onto PUSCH.

FIG. 6 shows an example mapping of CQI/PMI, RI and data onto PUSCH. As shown, CQI/PMI, RI, and data may be multiplexed onto PUSCH. As shown in FIG. 6, PUSCH RS 610, CQI/PMI 620, RI 630 and data 640 may be transmitted in RBs 605 over slot 0 660 and slot 1 670. As shown, RI 630 may be transmitted on the resources next to the PUSCH RS 610 on the PUSCH. The resources next to the PUSCH RS 610 may be reliable resources within a slot, as the channel estimates are of better quality. Therefore, by mapping the RI 630 on these resources, a lower coding rate may be used for RI signaling. This way, the overall control signaling overhead on PUSCH may be reduced.

Figure 16:
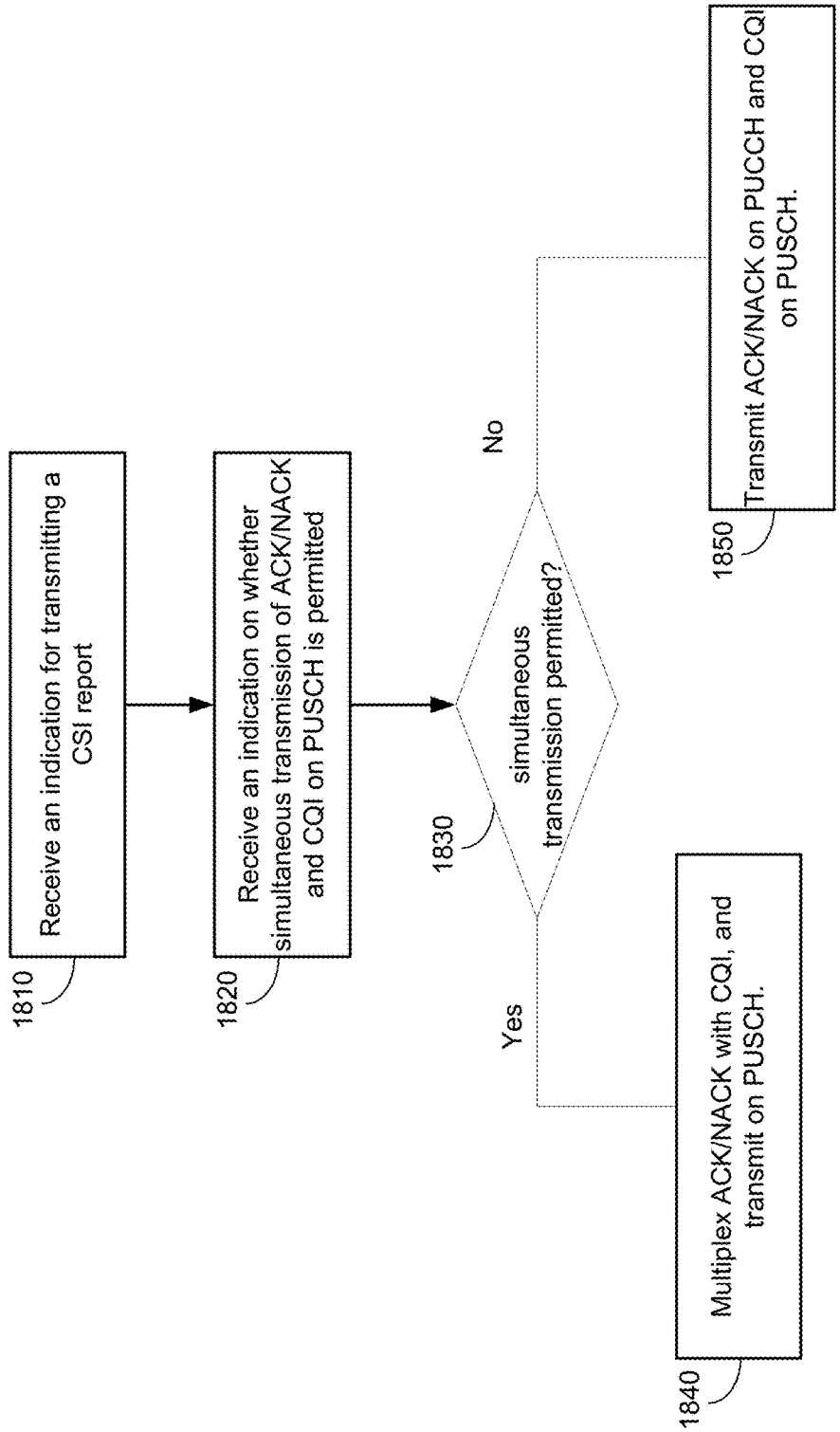
FIG. 16 shows an example method for transmitting a CSI report.

FIG. 16 shows an example method for transmitting a CSI report. For example, at 1810, an indication for transmitting a CSI report may be received. The CSI report may be a periodic report or an aperiodic report. According to the indication, a HARQ ACK/NACK report and a CQI report may coincide in a subframe. At 1820, an indication on whether simultaneous transmission of ACK/NACK and CQI on PUSCH is allowed may be received. For example, a parameter such as simultaneousAckNackAndCQIPUSCH may be provided by higher layers. For example, when the parameter simultaneousAckNackAndCQIPUSCH is set TRUE, the CQI/PMI/RI may be allowed to simultaneously transmit HARQ ACK/NACK and CQI in the same subframe on PUSCH, and when the parameter simultaneousAckNackAndCQIPUSCH is set FALSE, the WTRU 102 may not be allowed to simultaneously transmit HARQ ACK/NACK and CQI in the same subframe on PUSCH. If it is determined that simultaneous transmission of HARQ ACK/NACK and CQI/PMI/RI is allowed at 1830, at 1840, HARQ ACK/NACK may be multiplexed with CQI/PMI/RI, and be transmitted on PUSCH. If it is determined that simultaneous transmission of HARQ ACK/NACK and CQI/PMI/RI is not allowed at 1830, at 1850, HARQ ACK/NACK may be transmitted on PUCCH, and CQI/PMI/RI may be transmitted on PUSCH. In another embodiment, if it is determined that simultaneous transmission of HARQ ACK/NACK and CQI/PMI/RI is not allowed at 1830, HARQ ACK/NACK may be transmitted on PUCCH, and CQI/PMI/RI report may be dropped.

Separate transmission of HARQ ACK/NACK on PUCCH and CQI/PMI/RI on PUSCH may be conFIG.d by higher layer signaling. For example, the parameter simultaneousAckNackAndCQIPUSCH may be defined for periodic CQI report and/or aperiodic CQI reporting. For example, the parameter simultaneousAckNackAndCQIPUSCH may be included in IE CQI-ReportConfig as follows:

```
CQI-ReportConfig_R10 ::=           SEQUENCE {
    cqi-ReportModeAperiodic        ENUMERATED {
                                       rm12, rm20, rm22, rm30, rm31,
                                       spare3, spare2, spare1} OPTIONAL,    -- Need OR
    nomPDSCH-RS-EPRE-Offset        INTEGER (-1..6),
    simultaneousAckNackAndCQIPUSCH BOOLEAN
    cqi-ReportPeriodic             CQI-ReportPeriodic   OPTIONAL             -- Need ON
}
CQI-ReportPeriodic ::=             CHOICE {
    release                            NULL,
    setup                              SEQUENCE {
        cqi-PUCCH-ResourceIndex            INTEGER (0.. 1185),
        cqi-pmi-ConfigIndex                INTEGER (0..1023),
        cqi-FormatIndicatorPeriodic        CHOICE {
            widebandCQI                        NULL,
            subbandCQI                         SEQUENCE {
```

```
        k                           INTEGER (1..4)
     }
   },
   ri-ConfigIndex                   INTEGER (0..1023)  OPTIONAL,  -- Need OR
   simultaneousAckNackAndCQI        BOOLEAN
 }
}
```

In an embodiment, opportunistic transmission of CSI for multiple carriers may be used when PUCCH and PUSCH are transmitted in same sub-frame. For example, the WTRU 102 may report CSI for a first carrier on PUSCH in a sub-frame, if a grant for transmitting PUSCH exists in this subframe and if CSI for a second carrier is reported on PUCCH in the same sub-frame. The first and the second carriers may be different carriers. In an embodiment, the CSI for the second carrier may not be reported on PUCCH until Na sub-frames after the present or current subframe. For example, the WTRU 102 may report CSI for a carrier on PUSCH in a sub-frame, if an UL grant to transmit on PUSCH may exist in the sub-frame. In another embodiment, the WTRU 102 may report CSI for a carrier on PUSCH in a sub-frame, if CSI for the carrier has not been reported within the last predetermined Nb subframes, for example, on PUCCH only, PUSCH only, or on either PUCCH or PUSCH.

Figure 7:
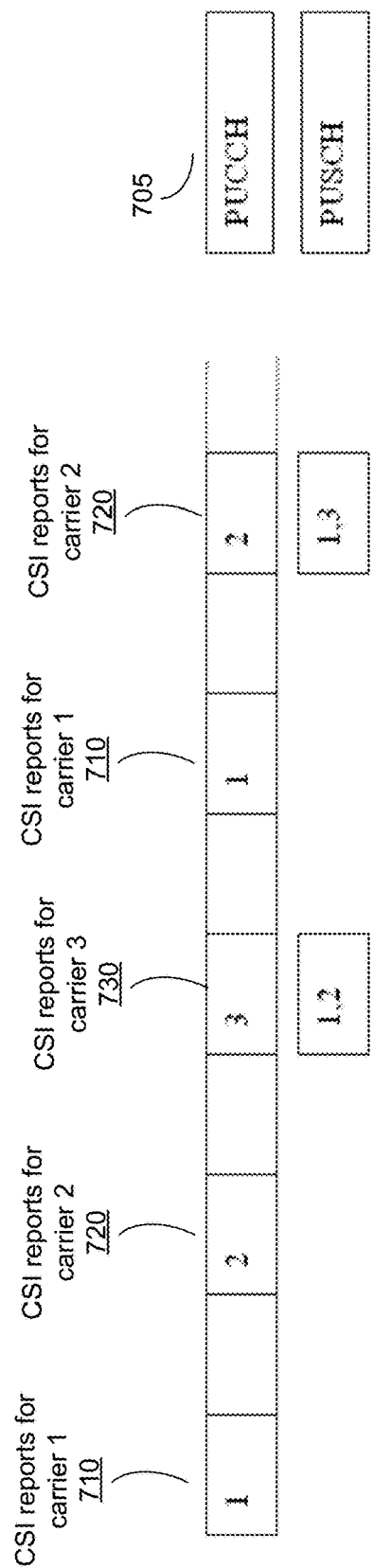
FIG. 7 illustrates example opportunistic transmission of CSI for multiple carriers.

FIG. 7 illustrates example opportunistic transmission of CSI for multiple carriers. As shown in FIG. 7, the WTRU 102 may operate with multiple carriers such as three carriers. The WTRU 102 may be conFIG.d to transmit periodic CSI reports on PUCCH, with cycling between the carriers. As shown, CSI reports for carrier 1 710, CSI reports for carrier 2 720, CSI reports for carrier 3 730 may be transmitted periodically, one carrier at a time, with cycling in between. The transmission of a CSI report for a single carrier at a time in a PUCCH subframe may help the network to avoid over-allocating PUCCH resources for CSI reporting. Because CSI is reported less frequently for a given carrier, there may be a latency issue for the CSI if multiple downlink carriers needed to be utilized. Opportunistic transmission of CSI may enable the network to accelerate the reporting of CSI for these carriers by providing an UL grant to the WTRU, without incurring the cost of a full aperiodic CQI report.

According to an embodiment, the HARQ ACK/NACK information bits and the CSI bits may be jointly encoded prior to scrambling and modulation and be transmitted on a PUCCH subframe. The payload sizes for the HARQ ACK/NACK and the CSI transmissions may be different. The channel coding rate may vary based on the number of activated or conFIG.d DL CCs and/or transmission modes for which HARQ feedback or periodic CSI are to be transmitted.

For example, the channel encoder may be a block coding-type scheme such as punctured (64, k) Reed-Muller (RM) code for a DFT-S-OFDM based or similar structure with SF=5 or punctured (128, k) Reed-Muller code for DFT-S-OFDM based structure with SF=3.

For example, when SF=5, a (48, A) block code may be derived from a punctured RM(64,k) and/or a cyclically repeated RM(32,k). The block code may be used where A is the payload size of the UCI. The codewords of RM may be a linear combination of the N basis sequences denoted $M_{i,n}$, where N may be the maximum number of PUCCH payload bits. Depending on whether discontinuous transmission (DTX) may be signaled for a DL CC, the value of N may be, for example, between 10-12 bits or the like, for the maximum number of aggregated CCs. For example, the maximum number of aggregated CCs may be 5 DL CCs. The encoded bit sequence of length 48 at the output of the channel encoder may be denoted by $b_0, b_1, \ldots, b_{47}$ where $$b_i = \sum_{n=0}^{A-1} a_n \cdot M_{i,n} \quad i = 0, 1, \ldots, 47$$

with $a_0, a_1, \ldots, a_{A-1}$ as the input bits to the channel encoder.

Both addition and multiplication operations in the above formula may be performed in vector-space domain, for example, $1 \cdot 1 = 1$, $0 \cdot 1 = 0$, $1 \cdot 0 = 0$, $0 \cdot 0 = 0$, $1 + 1 = 0$, $0 + 1 = 1$, $1 + 0 = 1$, $0 + 0 = 0$.

Joint coding may be applied across both slots of a PUCCH subframe. Joint coding across both slots may maximize the maximum achievable frequency diversity gain for UCI transmissions on PUCCH. Joint coding may be applied across a single slot. For example, an RM(32,k) encoded sequence may be repeated on both slots for SF=5. For example, an RM(64,k) encoded sequence may be repeated on both slots for SF=3.

In the case of joint coding using a rate-matched RM (32, k) across a subframe, basis sequences may be defined to support joint channel coding. The total payload size of CSI and HARQ ACK/NACK may exceed 11 bits. The payload size of CQI in Rel-8 may vary from one to 11 bits while the payload size of HARQ ACK/NACK in Rel-10 or later releases may vary from 1 to 11 bits. In an embodiment, the 11 basis sequences provided in Rel-8 specification for RM (32, k) may be extended by defining additional basis sequences. These newly introduced basis sequences may be derived from the Reed-Muller encoding matrix used for forming other previously defined basis sequences. Applicable interleaving function that has been applied on the legacy Rel-8 basis sequences may be applied to the extended basis sequences. For example, to support up to 13 bits of payload, two additional basis sequences may be defined and augmented in accordance with Table 7.

TABLE 7

The extended basis sequences for RM (32, k) code.

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | X | X |
| 1 | 1 | 1 | 1 | 0 | 0 | 0 | 0 | 0 | 0 | 1 | 1 | X | X |
| 2 | 1 | 0 | 0 | 1 | 0 | 0 | 1 | 0 | 1 | 1 | 1 | X | X |
| 3 | 1 | 0 | 1 | 1 | 0 | 0 | 0 | 0 | 1 | 0 | 1 | X | X |
| 4 | 1 | 1 | 1 | 1 | 0 | 0 | 0 | 1 | 0 | 0 | 1 | X | X |
| 5 | 1 | 1 | 0 | 0 | 1 | 0 | 1 | 1 | 1 | 0 | 1 | X | X |
| 6 | 1 | 0 | 1 | 0 | 1 | 0 | 1 | 0 | 1 | 1 | 1 | X | X |
| 7 | 1 | 0 | 0 | 1 | 1 | 0 | 0 | 1 | 1 | 0 | 1 | X | X |
| 8 | 1 | 1 | 0 | 1 | 1 | 0 | 0 | 1 | 0 | 1 | 1 | X | X |
| 9 | 1 | 0 | 1 | 1 | 1 | 0 | 1 | 0 | 0 | 1 | 1 | X | X |
| 10 | 1 | 0 | 1 | 0 | 0 | 1 | 1 | 1 | 0 | 1 | 1 | X | X |
| 11 | 1 | 1 | 1 | 0 | 0 | 1 | 1 | 0 | 1 | 0 | 1 | X | X |
| 12 | 1 | 0 | 0 | 1 | 0 | 1 | 0 | 1 | 1 | 1 | 1 | X | X |
| 13 | 1 | 1 | 0 | 1 | 0 | 1 | 0 | 1 | 0 | 1 | 1 | X | X |
| 14 | 1 | 0 | 0 | 0 | 1 | 1 | 0 | 1 | 0 | 0 | 1 | X | X |
| 15 | 1 | 1 | 0 | 0 | 1 | 1 | 1 | 1 | 0 | 1 | 1 | X | X |
| 16 | 1 | 1 | 1 | 0 | 1 | 1 | 0 | 0 | 0 | 1 | 0 | X | X |
| 17 | 1 | 0 | 0 | 1 | 1 | 1 | 0 | 0 | 1 | 0 | 0 | X | X |
| 18 | 1 | 1 | 0 | 1 | 1 | 1 | 1 | 1 | 0 | 0 | 0 | X | X |
| 19 | 1 | 0 | 0 | 0 | 0 | 1 | 1 | 0 | 0 | 0 | 0 | X | X |
| 20 | 1 | 0 | 1 | 0 | 0 | 0 | 1 | 0 | 0 | 0 | 1 | X | X |
| 21 | 1 | 1 | 0 | 1 | 0 | 0 | 0 | 0 | 0 | 1 | 1 | X | X |
| 22 | 1 | 0 | 0 | 0 | 1 | 0 | 0 | 1 | 1 | 0 | 1 | X | X |
| 23 | 1 | 1 | 1 | 0 | 1 | 0 | 0 | 0 | 1 | 1 | 1 | X | X |
| 24 | 1 | 1 | 1 | 1 | 1 | 0 | 1 | 1 | 1 | 1 | 0 | X | X |
| 25 | 1 | 1 | 0 | 0 | 0 | 1 | 1 | 1 | 0 | 0 | 1 | x | x |
| 26 | 1 | 0 | 1 | 1 | 0 | 1 | 0 | 0 | 1 | 1 | 0 | X | X |
| 27 | 1 | 1 | 1 | 1 | 0 | 1 | 0 | 1 | 1 | 1 | 0 | X | X |
| 28 | 1 | 0 | 1 | 0 | 1 | 1 | 1 | 0 | 1 | 0 | 0 | X | X |
| 29 | 1 | 0 | 1 | 1 | 1 | 1 | 1 | 1 | 0 | 0 | 0 | X | X |
| 30 | 1 | 1 | 1 | 1 | 1 | 1 | 1 | 1 | 1 | 1 | 1 | X | X |
| 31 | 1 | 0 | 0 | 0 | 0 | 0 | 0 | 0 | 0 | 0 | 0 | X | X |

According to an embodiment, HARQ ACK/NACK information bits and CSI bits may be separately encoded. For example, the HARQ ACK/NACK information bits and the CSI bits may be encoded using a different variable coding rate prior to scrambling and modulation and be transmitted on both slots of a PUCCH subframe. The HARQ ACK/NACK information bits and the CSI bits may be separately encoded such that the performance of various controls signaling may be kept at their respective target levels. The coding rate of each individual channel encoder may be adjusted based on the desired bit error rate (BER) or block error rate (BLER) operation point for a given control feedback type, when the payload sizes for the HARQ ACK/NACK and the CSI transmissions may be different. The payload sizes for the HARQ ACK/NACK and the CSI transmissions may be different based on the number of activated or conFIG.d DL CCs and/or transmission modes for which HARQ feedback or periodic CSI are to be transmitted.

For example, when the payload size is relative small, such as 2 bits, the channel encoder may include a block coding-type scheme. The block coding-type scheme may include simplex code with a circular rate matching into 48 or 96 coded bits depending on the spreading factor used for the DFT-S-OFDM based or similar structure. The channel encoder may be a tail-biting convolutional code that may generates 48 and 96 coded bits at output for the DFT-S-OFDM based structures with SF=5 and SF=3, respectively.

For example, an n-bit Cyclic Redundancy Check (CRC) may be computed based on control information and attached to the feedback information bits prior to the channel coding for improving error detection. The CRC may be of a variable size that may be adjusted based on the payload size of UCI or the type of control signaling such as HARQ ACK/NACK or CSI. A non-limiting example of the CRC length may be 8 bits that may achieve a miss detection rate of 0.4%. The CRC may lower the probability of false alarm at the eNodeB and therefore the performance target on Pr(DTX→ACK) may be relaxed. In an embodiment, the CRC may be indicative of the actual payload size used by the WTRU 102 prior to encoding, and/or the identity or number of the conFIG.d or activated DL CCs on which the WTRU 102 receives the DL assignment. Thus, the performance of detector may be improved when the WTRU 102 misses detecting the downlink assignment from the eNB on one or multiple DL CCs.

Figure 8:
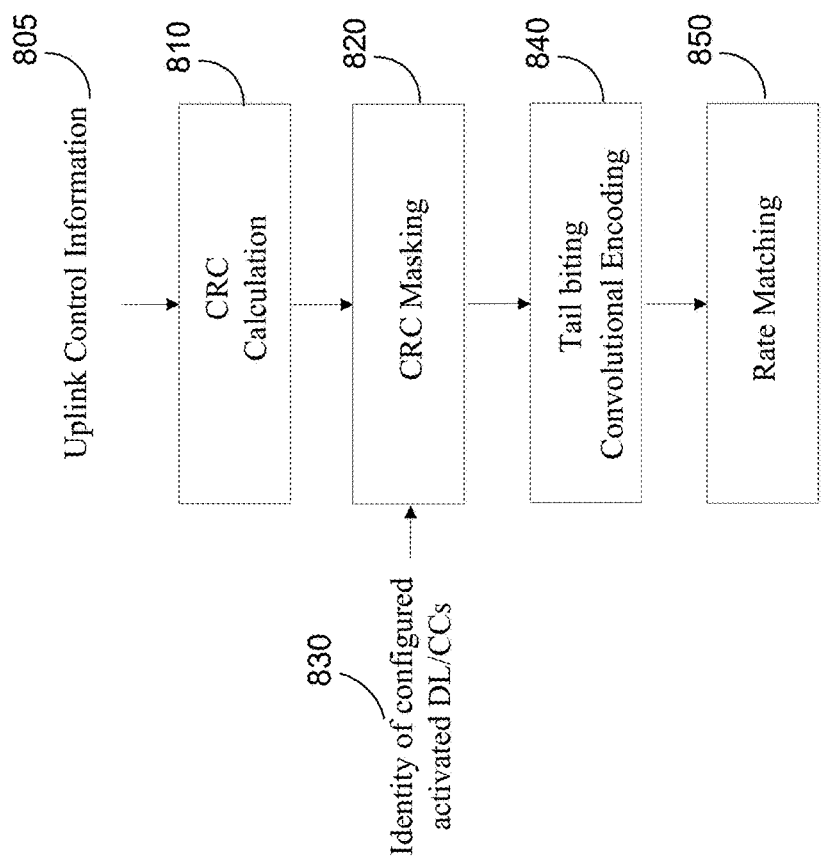
FIG. 8 illustrates a non-limiting exemplary PUCCH encoding chain for a DFT-S-OFDM based PUCCH transmission.

FIG. 8 illustrates a non-limiting exemplary PUCCH encoding chain for a DFT-S-OFDM based PUCCH transmission. As shown, the UCI data 805 to be fed back by the WTRU 102 may enter a coding unit. At 810, CRC parity bits may be calculated using UCI data 805. For example, the entire block may be used to calculate CRC parity bits. For example, the WTRU 102 may append the CRC bits to the UCI bits. At 820, the CRC bit sequence may be masked by identity or number of activated or conFIG.d DL CCs 830 on which the WTRU 102 may receive DL assignment. At 840, tail-biting convolutional encoding may be performed. For example, the WTRU 102 may apply a rate 1/3 tail-biting convolutional coding on the input bits. At 850, the coded bits may be fed to a rate matching block.

Figure 9:
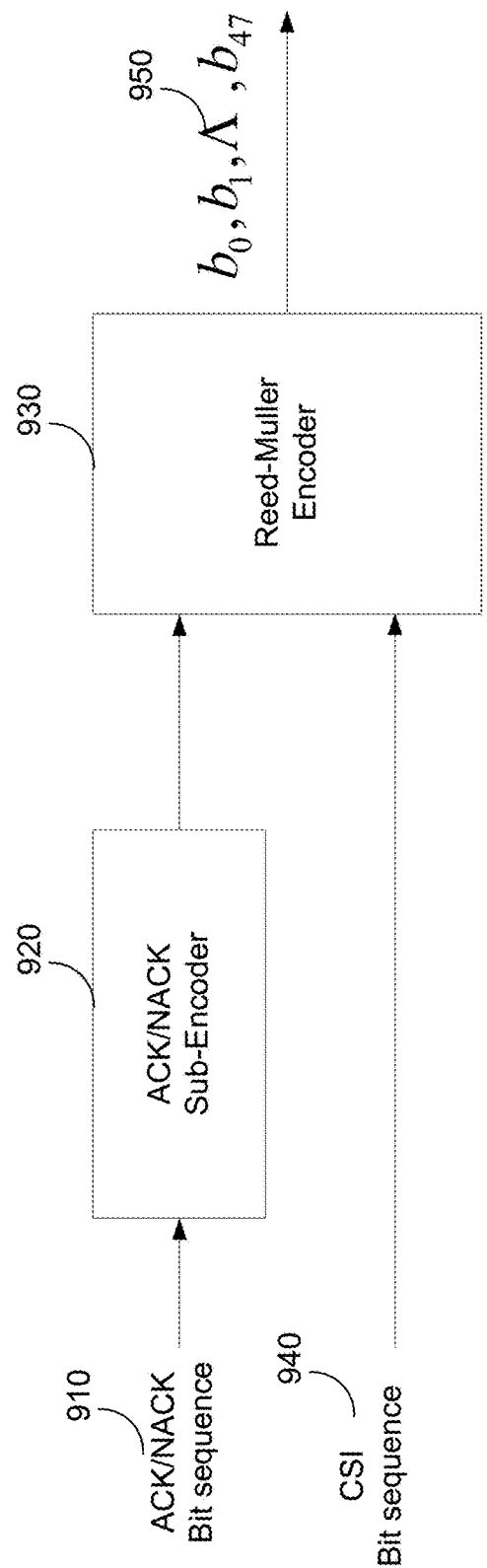
FIGS. 9-11 illustrate non-limiting exemplary encoding of HARQ ACK/NACK.

In an embodiment, the HARQ ACK/NACK information bits may be encoded using a sub-coder prior to joint coding with the CSI bits as shown in FIG. 9. As shown, HARQ ACK/NACK bit sequence 910 may be encoded via ACK/NACK sub-encoder 920. The encoded ACK/NACK bit sequence may be jointly encoded with CSI bit sequence 940 via Reed-Muller encoder 930 to produce output bit sequence 950.

For example, when ACK/NACK payload sizes are small, e.g., 3, 4 bits, or the like, the ACK/NACK sub-encoder of the WTRU 102 may include a simplex code and/or repetition code. When ACK/NACK payload sizes are large, e.g., 5 to 11 bits, the ACK/NACK sub-encoder of the WTRU 102 may be a Reed-Muller code.

In an embodiment, the sequence of ACK/NACK bits $a_0''$, $a_1''$, $a_2''$, ..., $a_{N_{A/N}-1}''$ may first be encoded by the WTRU 102 using a Reed-Muller code such as $RM(20, N_{A/N})$ as follows:

$$a_i = \sum_{n=0}^{N_{A/N}-1} a_n'' \cdot M_{i,n} \quad i = 0, 1, \ldots, A''-1$$

where $N_{A/N} \in \{1, 2, \ldots 11\}$ may be the number of ACK/NACK bits feedback and $A''=20$. The encoded ACK/NACK bit sequence $a_0, a_1, \ldots, a_{A''}$ may then be multiplexed with the CSI bit sequence of the WTRU 102 denoted by $a_0'$, $a_1'$, $a_2'$, $a_3'$, ..., $a_{A'-1}'$ to yield the sequence $a_0$, $a_1$, $a_2$, $a_3$, ..., $a_{A-1}$ as follows:

$a_{A''+i} = a_i'$, $i=0, \ldots, A'-1$. The sequence $a_0$, $a_1$, $a_2$, $a_3$, ..., $a_{A-1}$ may be encoded using a Reed-Muller code such as $RM(48, A)$ to yield the output bit sequence $b_0, b_1, b_2, b_3, \ldots, b_{B-1}$, as follows:

$$b_i = \sum_{n=0}^{N_A-1} a_n \cdot M_{i,n} \quad i = 0, 1, \ldots, B-1$$

where $B=48$ for DFT-S-OFDM based PUCCH with spreading factor of five.

Figure 10:
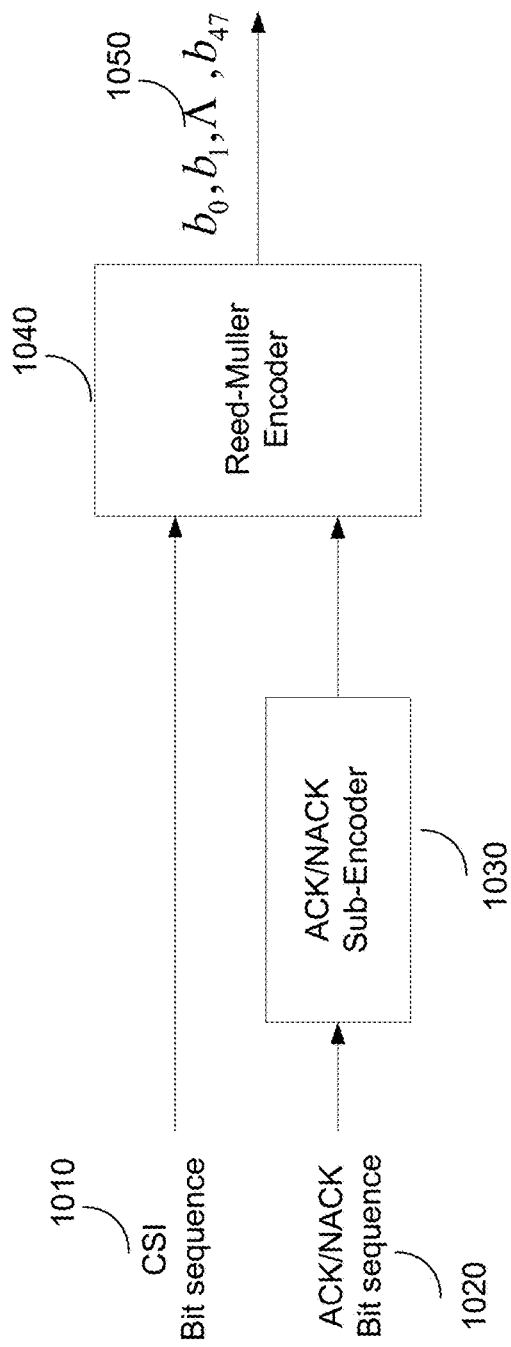

In an embodiment, the HARQ ACK/NACK encoded bits may be appended to the CSI bit sequence of the WTRU 102 prior to Reed-Muller encoding as illustrated in FIG. 10. As shown, the input orders of sub-coded ACK/NACK and CSI bit sequences may be exchanged to improve DTX handling at eNB. As shown in FIG. 10, ACK/NACK bit sequence 1020 may be encoded via ACK/NACK sub-encoder 1030. The encoded ACK/NACK bit sequence may be jointly encoded with CSI bit sequence 1010 via Reed-Muller encoder 1040 to produce output bit sequence 1050. A DTX situation may relate to the failure of the WTRU 102 to detect the DL resource allocation grant in a given subframe. The eNB may detect the CSI information bits of the WTRU 102 irrespective of whether ACK/NACK information bits are present.

Figure 11:
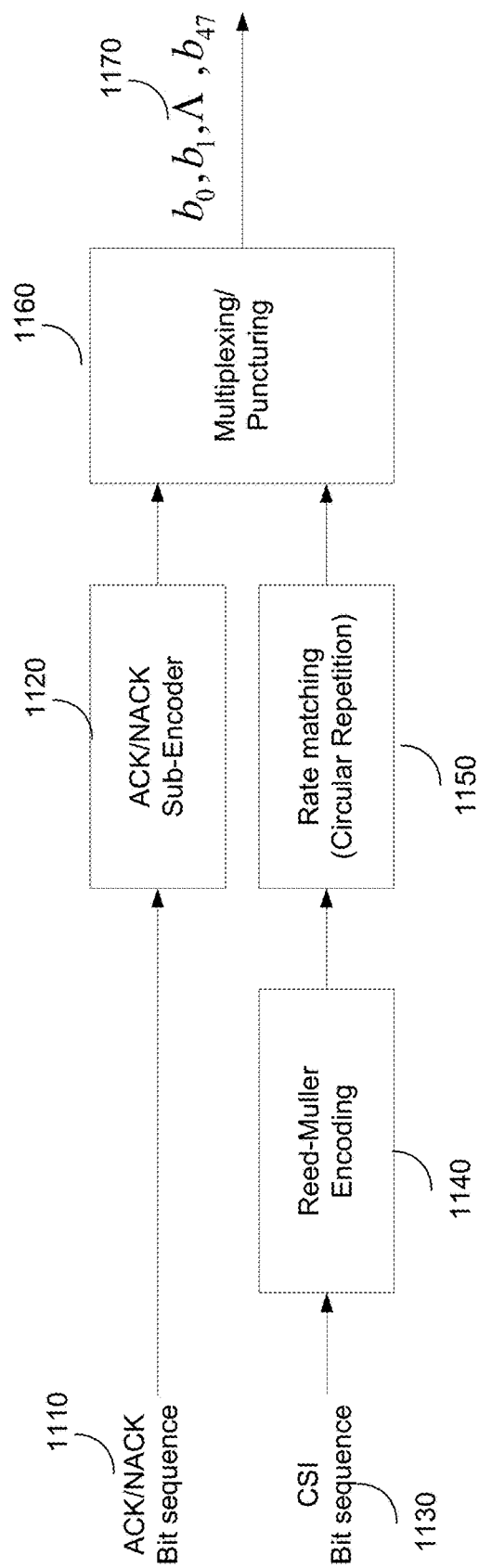

In an embodiment, the encoded HARQ ACK/NACK bits of the WTRU 102 may be punctured into the encoded CSI bit sequence as shown in FIG. 11. As shown, ACK/NACK bit sequence 1110 may be encoded via ACK/NACK sub-encoder 1120. CSI bit sequence 1130 may be encoded via Reed-Muller encoder 1140. The encoded CSI bit sequence may be fed into a rate matching module 1150. The encoded ACK/NACK bit sequence may be punctured into the CSI bit sequence via a multiplexing/puncturing module, to produce output sequence 1170.

The CSI bit sequence of the WTRU 102 may be encoded and rate matched to occupy the resources within a PUCCH RB, e.g., 48 bits. The non-punctured bits may be unaffected by the absence of the HARQ ACK/NACK bits of the WTRU 102 where the WTRU 102 may have missed the DL scheduling assignment, such as DTX.

For example, the channel quality bits input to the channel coding block of the WTRU 102 denoted by $a_0'$, $a_1'$, $a_2'$, $a_3'$, ..., $a_{A'-1}'$ may first encoded using an $RM(32, A')$. The output bit sequence $b_0, b_1, b_2, \ldots, b_{B-1}$ with $B=48$ may be obtained by circular repetition of the sequence $\tilde{b}_0, \tilde{b}_1, \tilde{b}_2, \ldots, \tilde{b}_{31}$ as follows:

$b_i = \tilde{b}_{(i \bmod 32)}$ where $i=0, 1, 2, \ldots, B-1$.

In an embodiment, the sequence of ACK/NACK bits $a_0''$, $a_1''$, $a_2''$, ..., $a_{N_{A/N}-1}''$ may be separately encoded to result in $b_0', b_1', b_2', b_3', \ldots, b_{B'-1}'$ where B' is the length of the encoded ACK/NACK sequence. For example, the encoded ACK/NACK sequence may be punctured into the encoded CSI sequence as follows:

$b_i = b_i'$, $i=0, \ldots, B'-1$

In an embodiment, physical resources may be mapped in DFT-S-OFDM PUCCH. For example, the WTRU 102 may employ a channel interleaver for uplink control information transmissions. The achievable frequency diversity gain may be thus maximized.

For example, the channel interleaving can be performed at the bit-level on the encoded bit sequence or on the scrambled bit sequence such that bits may be written to a rectangular matrix row-by-row and read out column-by-column. For example, bit sequence may be written to a 24 by 2 matrix for SF=5, or a 48 by 2 matrix for SF=3. In an embodiment, adjacent control bits may be mapped across the two slots.

For example, the channel interleaving may be applied on the symbol-level where adjacent uplink control information modulated symbols may be mapped first in the time domain across the two slots within a subframe, and then in the frequency-domain across the subcarriers within each slot. For example, even QPSK symbols may be transmitted on the even slots and odd QPSK symbols mapped on the odd slots.

In an embodiment, CSI and HARQ symbols may be multiplexed into PUCCH resource. For example, symbols may be multiplexed into PUCCH resource from CSI such as CQI, RI and/or PMI information, and HARQ ACK/NACK information, when separate coding and interleaving may applied on the different types of information.

For example, corresponding resources may be applied within a single RB. For example, dimensioning of the corresponding resources with respect to the ACK/NACK and/or CSI payload can be applied within a single RB such that channel coding gain may be improved.

In an embodiment, HARQ acknowledgements may be transmitted on PUCCH. The available resources on the PUCCH may be used for ACK/NACK/DTX feedback transmissions. In an example, the HARQ ACK/NACK symbols may be first mapped in the time-domain across the two slots and then across the frequency-domain across the subcarriers. In an example, the symbols may be first mapped in the frequency domain and second in the time domain.

In an embodiment, channel status reports may be transmitted on PUCCH. The available resources on the PUCCH may be used for CSI feedback transmissions. In an example, the channel status report symbols may be first mapped in the time-domain across the two slots and then across the frequency-domain across the subcarriers. In an example, the symbols may be first mapped in the frequency domain and second in the time domain.

In an embodiment, HARQ ACK/NACK and channel status report may be transmitted on PUCCH. HARQ symbols and CSI symbols may be multiplexed such that different control signaling may be allocated a different size of physical resource elements. The size of the reserved resources for each of ACK/NACK and CSI may be scaled according to the variable coding rate and/or the modulation order to for a given control signaling. The WTRU 102 may use different offsets for mapping of various controls signaling information. The offsets may be semi-statically, statically, or dynamically conFIG.d by higher-layer signaling. Control information may be mapped such that each of ACK/NACK and CSI may be present in both slots of a subframe.

For example, HARQ ACK/NACK feedback and CSI may be multiplexed into the same PUCCH resource. The respective number of symbols used for each type of information may be determined. For example, HARQ ACK/NACK may be prioritized over CSI information. The number of coded symbols required for HARQ ACK/NACK information, $Q_{AN\_PUCCH}$, may be determined. If $Q_{AN\_PUCCH}$ is smaller than the maximum available in the PUCCH, $Q_{MAX\_PUCCH}$, CSI information may be multiplexed. In an example, CSI information may be multiplexed based on a condition that $Q_{AN\_PUCCH}$ is less than $Q_{MAX\_PUCCH}$ by a threshold value. In an embodiment, if $Q_{AN\_PUCCH}$ equals to or is greater than $Q_{MAX\_PUCCH}$, or the difference between $Q_{AN\_PUCCH}$ and $Q_{MAX\_PUCCH}$ is lower than a threshold value, only HARQ ACK/NACK information may be transmitted. For example, multiplexing HARQ ACK/NACK information and CSI may not be performed.

In an embodiment, the mapping between $Q_{AN\_PUCCH}$ and $O_{AN\_PUCCH}$ may be fixed and may be provided in a look-up table. In an embodiment, $Q_{AN\_PUCCH}$ may be calculated based on a function of the number of HARQ information bits to transmit, $O_{AN\_PUCCH}$. In an embodiment, $Q_{AN\_PUCCH}$ may be calculated based on a proportionality factor, $B_{PUCCH}$, multiplying the number of HARQ ACK/NACK information bit to transmit. Parameter(s) of the function may be predefined or provided by higher layer. The proportionality factor, $B_{PUCCH}$, may adjust the fraction of the PUCCH energy available to HARQ ACK/NACK information. In an embodiment, $Q_{AN\_PUCCH}$ may be calculated based on the maximum number of symbols, $Q_{MAX\_PUCCH}$, that may be available for HARQ ACK/NACK information, and/or CSI information in a DFT-S-OFDM based PUCCH transmission. The number of symbols may be different based on whether extended or normal prefix is used.

The number of symbols $Q_{AN\_PUCCH}$ used for HARQ ACK/NACK information may correspond to the lower value between $Q_{MAX\_PUCCH}$ and $f(O_{AN\_PUCCH} \times B_{PUCCH})$, where the function $f()$ may provide the largest possible number of symbols for HARQ ACK/NACK information that may be smaller than the argument. In an embodiment, the function $f()$ may provide the smallest possible number of symbols for HARQ ACK/NACK information that may be larger than the argument. The function $f()$ may be defined such that a correct number of symbols may be allocated, given that the granularity of the number of symbols that may be used in a PUCCH may be larger than 1.

In an embodiment, the number of symbols available to CSI information, $Q_{CSI\_PUCCH}$, may be determined. For example, $Q_{CSI\_PUCCH}$ may be computed by comparing the number of symbols used for HARQ ACK/NACK information, $Q_{AN\_PUCCH}$, and the maximum number of symbols $Q_{MAX\_PUCCH}$. The number of symbols available to CSI information $Q_{CSI\_PUCCH}$ may include the difference between $Q_{MAX\_PUCCH}$ and $Q_{AN\_PUCCH}$. In an embodiment, there may be a minimum amount of symbols available to CSI information such that HARQ ACK/NACK information and CSI may be multiplexed. In an embodiment, the CSI information may be dropped when the amount of symbols available to CSI information is below a threshold value.

The type of CSI information and/or the number of DL serving cells being reported may be determined based on the number of available symbols for CSI. For instance, if $Q_{CSI\_PUCCH}$ is below a threshold value, only rank information (RI) for a single DL serving cell may be reported.

In an embodiment, the amount of CSI information that may be reported may be determined based on a maximum coding rate for CSI information. The maximum coding rate may be dependent on the type of CSI. For example, the maximum coding rate for RI may be lower than for other type of CSI with higher robustness requirement. For instance, the maximum number of information bits available for CSI, $O_{CSI\_PUCCH}$, may be calculated based on a maximum coding rate and number of available coded bits. In an embodiment, $O_{CSI\_PUCCH}$ may be the product between a maximum coding rate and number of available coded bits, rounded down or up to the closest integer or to the closest integer matching a possible number of CSI information bits. A ratio K between the number of coded bits and the number of symbols may correspond to the number of bits per modulation symbol divided by the spreading factor SF. The embodiments described above with respect to multiplexing HARQ ACK/NACK information with CSI may be used for the multiplexing of different types of CSI in the same subframe. For instance, RI may be multiplexed with CQI/PMI.

Figure 12:
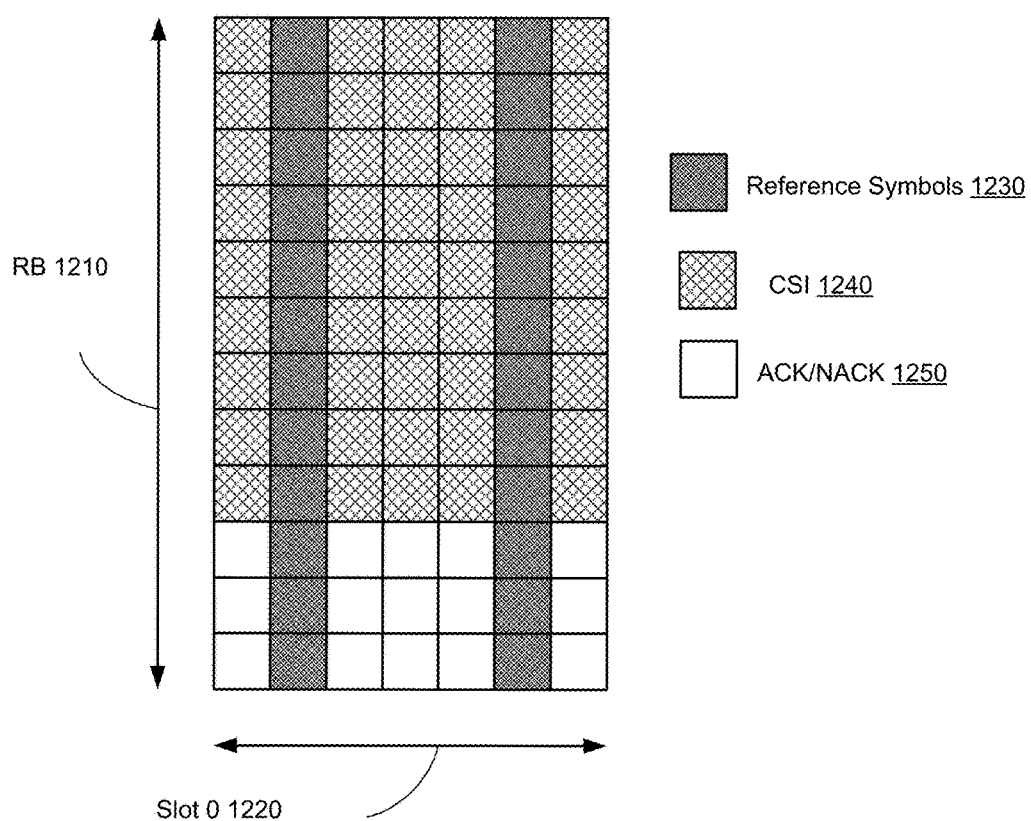
FIG. 12 illustrates a non-limiting exemplary control signal mapping for a DFT-S-OFDM-based PUCCH transmission.

FIG. 12 illustrates a non-limiting exemplary control signal mapping for a DFT-S-OFDM based PUCCH transmission. As shown, CSI resources 1240 may be placed at the beginning of RB 1210 and be mapped sequentially to the two slots on one subcarrier of slot 0 1220 before continuing on the next subcarrier until all resources allocated for CSI transmission are filled. HARQ ACK/NACK symbols 1250, on the other hand, may be placed at the end of RB 1210. In other words, CSI 1240 may be frequency multiplexed with HARQ ACK/NACK 1250 on the PUCCH.

According to an embodiment, the CSI transmitted on PUCCH may use the same modulation scheme as the HARQ acknowledgements. Alternatively, CSI and HARQ control signaling may be performed using different modulation schemes. For example, HARQ ACK/NACK may be modulated using QPSK modulation, and CSI may be modulated using higher order modulations such as QAM16 or QAM64.

Various multiplexing methods may be used. The HARQ ACK/NACK symbols may be placed at both extremities of the RB frequency-wise. This may be performed within each slot, or the symbols may be placed at one extremity for the first slot and at the other extremity for the second slot. Such an arrangement may maximize frequency diversity for the HARQ ACK/NACK symbols. The above-described arrangement may be used for CSI symbols. In another embodiment, the subcarriers where HARQ ACK/NACK symbols are placed may be positioned at equal frequency distance from each other. Alternatively, or in addition, the subcarriers where CSI symbols are placed may be positioned at equal or substantially equal frequency distance.

When CSI information is multiplexed with HARQ ACK/NACK information, the encoding of the CSI information may be performed. In an embodiment using puncturing, CSI information may first be encoded assuming a number of coded bits corresponding to the maximum number of symbols available for HARQ ACK/NACK information and CSI, $Q_{MAX\_PUCCH}$. For instance, the encoding may be using a Reed-Muller code $RM(K \times Q_{MAX\_PUCCH}, O_{CSI\_PUCCH})$ where K may be the ratio between the number of coded bits and the number of symbols. The CSI coded bits may then be interleaved, modulated, spread, and positioned in available symbol locations in the PUCCH. The HARQ ACK/NACK information may also be encoded, interleaved, modulated, spread, and then positioned into a subset of the symbol locations previously utilized by CSI information, in effect puncturing the coding of the CSI. The subset of symbols used may be determined according to the embodiments of the described above.

In an embodiment, CSI information may be directly encoded assuming a number of coded bits corresponding to the number of symbols available to CSI ($Q_{CSI\_PUCCH}$). For instance, the encoding might be using a Reed-Muller code RM($K \times Q_{CSI\_PUCCH}$, $O_{CSI\_PUCCH}$) where K may be the ratio between the number of coded bits and the number of symbols. The CSI coded bits may then be interleaved, modulated, spread, and positioned in symbol locations identified for CSI information. The HARQ ACK/NACK information may also be encoded, interleaved, modulated, spread, and then positioned into symbol locations not utilized by CSI information. The symbol locations for HARQ ACK/NACK information and CSI may be determined. The transmission of CSI may be prioritized on the codeword with the highest quality metric, for example, Signal to Interference plus Noise Ratio (SINR).

The WTRUs 102 may be scheduled to share the same RB for their UL feedback transmissions. Sharing the PUCCH resource blocks for both HARQ ACK/NACK and CSI transmissions may lead to lower control signalling overhead in the system.

When CSI is multiplexed with HARQ ACK/NACK information, the transmission power may be adjusted as a function of at least one of, the number of HARQ ACK/NACK bits, the number of HARQ ACK/NACK bits corresponding to detected PDCCH transmissions or semi-persistent scheduling assignments, the number of CSI bits, the number of RI bits, and/or the number of symbols in the PUCCH utilized for transmission of HARQ ACK/NACK, CSI, and/or RI, in case of separate coding.

More specifically, the transmission power may be based on the number of HARQ ACK/NACK bits, or HARQ ACK/NACK bits corresponding to detected PDCCH transmissions or semi-persistent scheduling assignments, divided by the number or fraction of symbols of PUCCH utilized for the transmission of this information. The transmission power may be based on the number of CSI bits divided by the number or fraction of symbols of PUCCH utilized for the transmission of this information. The transmission power may be based on the number of RI bits divided by the number or fraction of symbols of PUCCH utilized for the transmission of this information. The number or fraction of symbols of PUCCH for the transmission of CSI or HARQ ACK/NACK may be based on the numbers of CSI and/or HARQ ACK/NACK information bits as described above.

CSI payload may be transmitted by allocating the corresponding control region in the uplink. In an embodiment, some of the resource blocks (RBs) that may otherwise be reserved for PUSCH transmission in UL may be reserved for a CSI structure. In case the HARQ ACK/NACK and CSI collide on the same subframe, CSI may be multiplexed with ACK/NACK.

Figure 13:
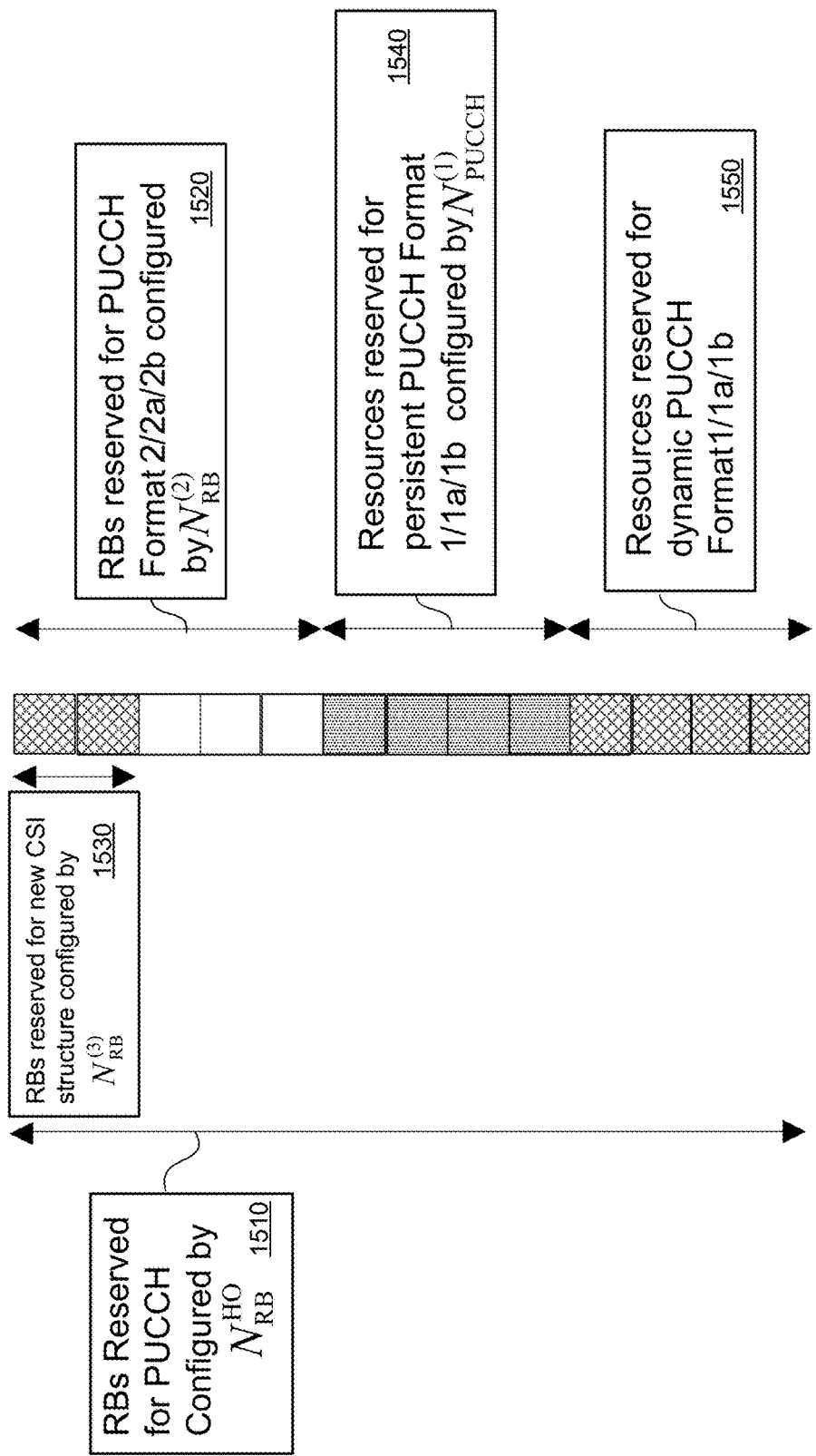
FIG. 13 illustrates example PUCCH configuration for resource allocation on PUCCH.

FIG. 13 illustrates an example PUCCH configuration for resource allocation on PUCCH. As shown, some of the RBs that may otherwise be reserved for PUCCH transmission in UL may be allocated for CSI structures. For example, the PUCCH Format 2/2a/2b 1520 from the system perspective may be over-dimensioned, and the outermost RBs 1530 may be allocated to the CSI structures, such as PUCCH Format 3/3x. In case an HARQ ACK/NACK report and a CQI report coincide in a subframe, PUCCH Format 3/3x can be used for concurrent transmission of CSI and HARQ ACK/NACK. As shown in FIG. 13, RBs 1540 may be resources that may be reserved for persistent PUCCH format 1/1a/1b as conFIG.d by $N_{PUCCH}^{(1)}$ and RBs 1550 may be resources reserved for dynamic PUCCH format 1/1a/1b.

Figure 14:
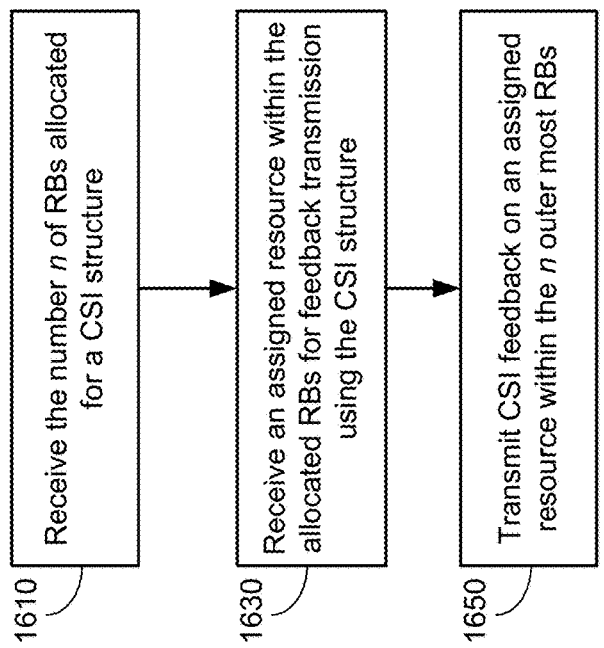
FIG. 14 illustrates an example process for transmitting CSI feedback.

FIG. 14 illustrates example method for transmitting CSI feedback. For example, at 1610, the number of RBs allocated for a CSI report structure may be received. The CSI report structure may include PUCCH Format 3/3x. The WTRU 102 may be conFIG.d by higher layer regarding the number of RBs that may be allocated for new CSI feedback transmissions within the PUCCH control region. For example, the WTRU 102 may receive a system parameter, such as $N_{RB}^{(3)}$, via broadcast from the system. The system parameter may be dynamically adjusted based on the average number of active UEs (e.g. Re-10 or later UEs) that the system is expected to support. At 1630, a schedule assigned resource within the allocated RBs on the PUCCH for feedback transmission using the CSI structure may be received. The resources used for transmission of PUCCH Format 3/3x can be identified by a resource index such as $n_{PUCCH}^{(3)}$. This parameter may be explicitly signaled via WTRU-specific higher-layer signaling. For example, the scheduler may assign those RBs to Rel-10 UEs for transmission of feedback using the CSI structures. From a Rel-8 WTRU perspective, the WTRU 102 may not be assigned any resources on the outermost RBs by the scheduler at eNodeB. Through configuration, this approach may be transparent to a Rel-8 WTRU, and backward compatibility may be fully maintained. At 1650, CSI feedback may be transmitted on an assigned resource within the outer most allocated RBs for the CSI structure.

One advantage of allocating the outermost RBs to the newly introduced control region is that the achievable frequency diversity may be maximized when the frequency hopping is used. This approach may compensate for the potential loss due to the higher overhead in the new CSI carrying channel to some extent.

Figure 15:
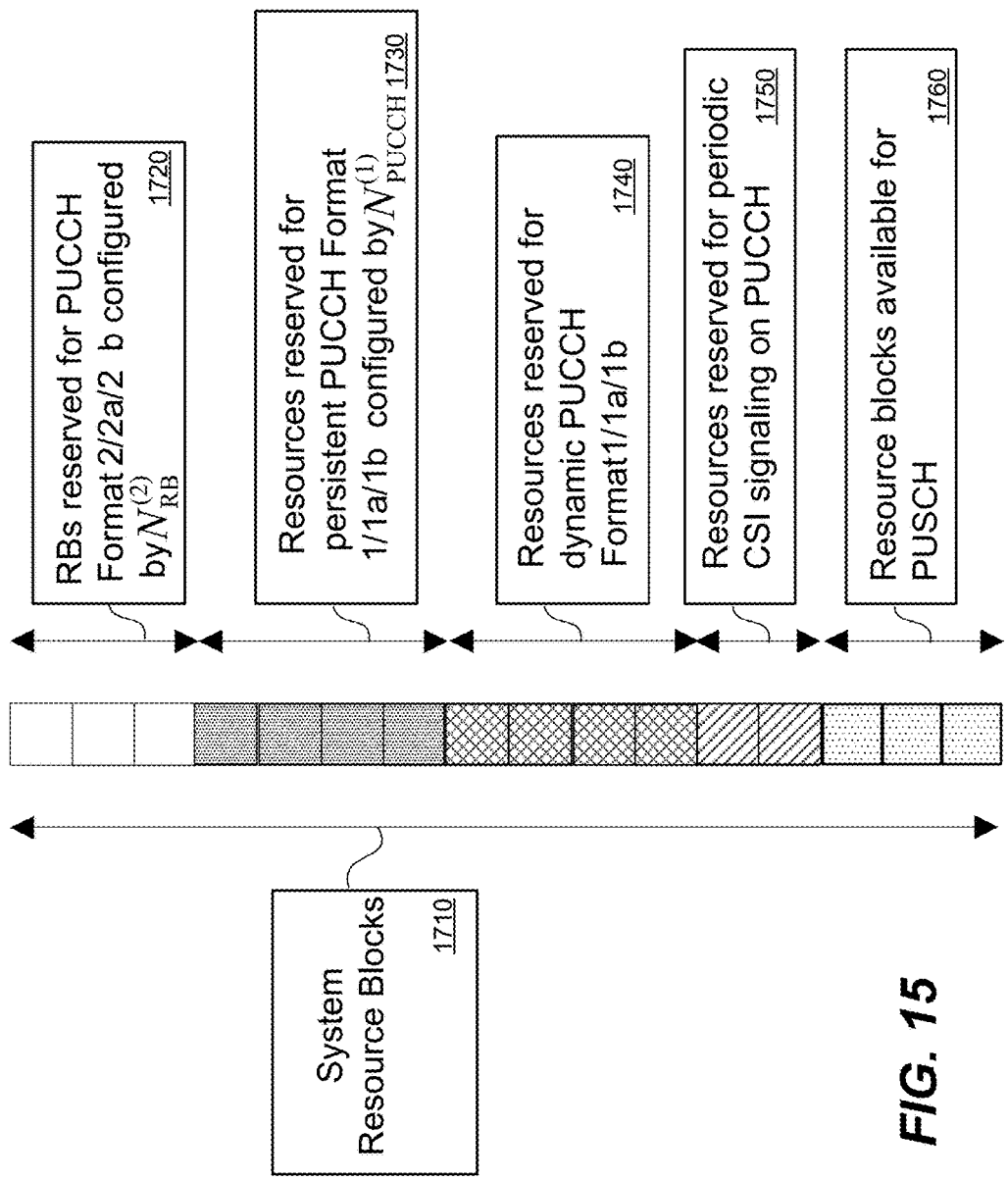
FIG. 15 shows an example PUCCH configuration.

In an embodiment, CSI payload may be transmitted by allocating some of the RBs that otherwise may be reserved for PUSCH transmission in UL for CSI structure. FIG. 15 shows an example PUCCH configuration. As shown, system RBs 1710 may include RBs 1720 that may be reserved for PUCCH format 2/2a/2b as conFIG.d by $N_{RB}^{(2)}$, RBs 1730 that may be reserved for persistent PUCCH format 1/1a/1b as conFIG.d by $N_{PUCCH}^{(1)}$ RBs 1740 that may be reserved for dynamic PUCCH format 1/1a/1b, RBs 1750 that may be reserved for periodic CSI signaling on PUCCH, and RBs 1760 that may be available for PUSCH. For example, the PUSCH RBs 1760 next to the RBs 1740 reserved for dynamic ACK/NACK transmissions on PUCCH Format 1/1a/1b may be allocated for transmitting CSI.

From the system perspective, the scheduler may not schedule any PUSCH transmission on these reserved RBs. This approach may be fully backward compatible and transparent to an earlier-versioned WTRU such as a Rel-8 WTRU through proper scheduling. UEs, such as Rel-10 UEs or later-versioned UEs, may be conFIG.d through a broadcasted system parameter regarding the maximum number of RBs reserved for periodic CSI feedback transmissions.

A Transmission Timing Interval (TTI) bundling scheme may be applied to the periodic CSI feedbacks transmitted on those PUSCH RBs. The UL coverage reliability of the new CSI structure transmitted on PUSCH may be improved. This approach may be considered as a repetition scheme that may replace the HARQ process currently applied on PUSCH for data transmission in Rel-8. Accordingly, a single periodic report may be transmitted in a set of consecutive TTIs on the same resources on PUSCH. TTI bundling may be triggered through a WTRU-specific higher layer signalling.

WTRUs, such as Rel-10 UEs or later-versioned UEs, may be conFIG.d by higher layer regarding the number of RBs that are allocated for new CSI feedback transmissions within the PUSCH control region. For example, a broadcasted system parameter such as $N_{RB}^{(3)}$ may be defined. This parameter may be dynamically adjusted based on the average number of active WTRUs, e.g. Re-10 or later UEs, that the system is expected to support. The resources used for transmission can be identified by a resource index such as $n_{PUCCH}^{(3)}$. This parameter may be explicitly signaled via WTRU-specific higher-layer signaling.

In an embodiment, CSI payload may be extended by defining a control region that may include one or more RB(s). For example, a separate region in the UL which may span over single or multiple RB(s) may be allocated for CSI with or without HARQ ACK/NACK transmissions.

CSI payload may be extended by allocating the corresponding control region. In an embodiment, some of the resource blocks (RBs) that may otherwise be reserved for PUCCH transmission in UL may be reserved for CSI structure.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) for reporting periodic channel state information (CSI), the WTRU comprising:
a processor configured to:
   determine that there is a report collision in a subframe between a first periodic CSI report for a first serving cell and a second periodic CSI report for a second serving cell, wherein the first periodic CSI report for the first serving cell corresponds to a first physical uplink control channel (PUCCH) reporting type and the second periodic CSI report for the second serving cell corresponds to a second PUCCH reporting type;
   determine that the first periodic CSI report for the first serving cell is prioritized over the second periodic CSI report for the second serving cell based on the first PUCCH reporting type being higher priority than the second PUCCH reporting type; and
   send the first periodic CSI report for the first serving cell via a PUCCH.

2. The WTRU of claim 1, wherein the processor is further configured to determine that the WTRU is not configured for simultaneous physical uplink shared channel (PUSCH) and PUCCH transmission.

3. The WTRU of claim 1, wherein the processor is further configured to determine a periodic CSI report configuration for the first serving cell.

4. The WTRU of claim 3, wherein the periodic CSI report configuration comprises a reporting period and a report type offset.

5. The WTRU of claim 3, wherein the processor is further configured to determine that the first periodic CSI report for the first serving cell is prioritized over the second periodic CSI report for the second serving cell based on the first PUCCH reporting type being higher priority than the second PUCCH reporting type, and the periodic CSI report configuration.

6. The WTRU of claim 1, wherein the first serving cell is in an active state and the second serving cell is in a deactivated state, and wherein the processor is further configured to determine that the first periodic CSI report for the first serving cell is prioritized over the second periodic CSI report for the second serving cell based on the first PUCCH reporting type being higher priority than the second PUCCH reporting type such that the report for second serving cell is prevented from being reported while the second serving cell is in the deactivated state.

7. A method for reporting periodic channel state information (CSI) comprising:
determining, via a wireless transmit/receive unit (WTRU), that there is a report collision in a subframe between a first periodic CSI report for a first serving cell and a second periodic CSI report for a second serving cell, wherein the first periodic CSI report for the first serving cell corresponds to a first physical uplink control channel (PUCCH) reporting type and the second periodic CSI report for the second serving cell corresponds to a second PUCCH reporting type;
determining that the first periodic CSI report for the first serving cell is prioritized over the second periodic CSI report for the second serving cell based on the first PUCCH reporting type being higher priority for the second PUCCH reporting type; and
sending first the periodic CSI report for the first serving cell via a PUCCH.

8. The method of claim 7, further comprising determining the WTRU is not configured for simultaneous physical uplink shared channel (PUSCH) and PUCCH transmission.

9. The method of claim 7, further comprising determining a periodic CSI report configuration for the first serving cell.

10. The method of claim 9, wherein the periodic CSI report configuration comprises a reporting period and a report type offset.

11. The method of claim 9, wherein determining that the first periodic CSI report for the first serving cell is prioritized over the second periodic CSI report for the second serving cell based on the first PUCCH reporting type being higher priority than the second PUCCH reporting type, and the periodic CSI report configuration.

12. The method of claim 7, wherein the first serving cell is in an active state and the second serving cell is in a deactivated state, and wherein the processor is further configured to determine that the first periodic CSI report for the first serving cell is prioritized over the second periodic CSI report for the second serving cell based on the first PUCCH reporting type being higher priority than the second PUCCH reporting type such that the report for the second serving cell is prevented from being reported while the second serving cell is in the deactivated state.

* * * * *